United States Patent
Khosla et al.

(10) Patent No.: US 12,205,463 B2
(45) Date of Patent: Jan. 21, 2025

(54) SMART TRAFFIC MANAGEMENT

(71) Applicant: QUALCOMM Incorporated, San Diego, CA (US)

(72) Inventors: Abha Khosla, San Diego, CA (US); Mohammed Ataur Rahman Shuman, San Diego, CA (US); Soumya Das, San Diego, CA (US); Srujith Reddy Katamreddy, Ingolstadt (DE); Phani Kumar Dasam, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 17/648,780

(22) Filed: Jan. 24, 2022

(65) Prior Publication Data
US 2023/0237904 A1 Jul. 27, 2023

(51) Int. Cl.
G08G 1/0967 (2006.01)
B60W 60/00 (2020.01)
G07B 15/06 (2011.01)

(52) U.S. Cl.
CPC ..... G08G 1/096725 (2013.01); B60W 60/001 (2020.02); G07B 15/063 (2013.01); G08G 1/096775 (2013.01); B60W 2552/10 (2020.02); B60W 2554/40 (2020.02); B60W 2555/20 (2020.02); B60W 2556/45 (2020.02)

(58) Field of Classification Search
CPC ...... G08G 1/096725; G08G 1/096775; B60W 60/001; B60W 2556/45; B60W 2555/20; B60W 2554/40; B60W 2552/10; G07B 15/63
See application file for complete search history.

(56) References Cited

U.S. PATENT DOCUMENTS

| 11,763,410 B1 * | 9/2023 | Roy ..................... G06Q 20/407 701/117 |
| 2018/0058865 A1 * | 3/2018 | Takeuchi ........... G01C 21/3461 |

(Continued)

FOREIGN PATENT DOCUMENTS

| KR | 20210103026 A | 8/2021 |
| WO | 2021012145 A1 | 1/2021 |

OTHER PUBLICATIONS

International Search Report and Written Opinion—PCT/US2022/050778—ISA/EPO—Mar. 24, 2023.

*Primary Examiner* — Behrang Badii
*Assistant Examiner* — Jay Khandpur
(74) *Attorney, Agent, or Firm* — Procopio, Cory, Hargreaves & Savitch LLP/Qualcomm

(57) ABSTRACT

A vehicle may transmit, to a network entity, a lane use request message associated with a lane for the vehicle. The network entity may identify lane information associated with a lane for a vehicle. The network entity may identify vehicle information associated with the vehicle. The network entity may transmit, to the vehicle, and the vehicle may receive, from the network entity, a lane use grant message based on at least one of the identified lane information or the identified vehicle information. The lane use grant message may be indicative of a permission for the vehicle to use the lane. The vehicle may not be permitted to use the lane without the permission. The lane may correspond to a flexible direction lane, an emergency lane, a road shoulder, an HOV lane, or a passing lane.

12 Claims, 17 Drawing Sheets

(56) References Cited

U.S. PATENT DOCUMENTS

| | | | |
|---|---|---|---|
| 2018/0204449 A1* | 7/2018 | Bansal | G08G 1/08 |
| 2018/0362032 A1 | 12/2018 | Yang et al. | |
| 2019/0039627 A1* | 2/2019 | Yamamoto | B60W 30/18163 |
| 2019/0340453 A1* | 11/2019 | Papineau | G07B 15/063 |
| 2019/0385446 A1 | 12/2019 | Lepp et al. | |
| 2020/0114920 A1* | 4/2020 | Zhang | G08G 1/096741 |
| 2021/0039650 A1* | 2/2021 | Yu | B60W 30/18163 |
| 2021/0043075 A1 | 2/2021 | Kourous-Harrigan et al. | |
| 2021/0331699 A1 | 10/2021 | Kim | |
| 2021/0407283 A1 | 12/2021 | Toyokita et al. | |
| 2022/0104306 A1* | 3/2022 | Shrestha | H04W 76/27 |
| 2022/0203993 A1* | 6/2022 | Taniguchi | B60W 30/143 |
| 2022/0274593 A1* | 9/2022 | McFarland, Jr. | G08G 1/0133 |
| 2022/0295217 A1* | 9/2022 | Hwang | H04W 4/021 |
| 2022/0335826 A1* | 10/2022 | Tsuda | B60W 30/18 |
| 2022/0396262 A1* | 12/2022 | Totzke | B60W 50/14 |

* cited by examiner

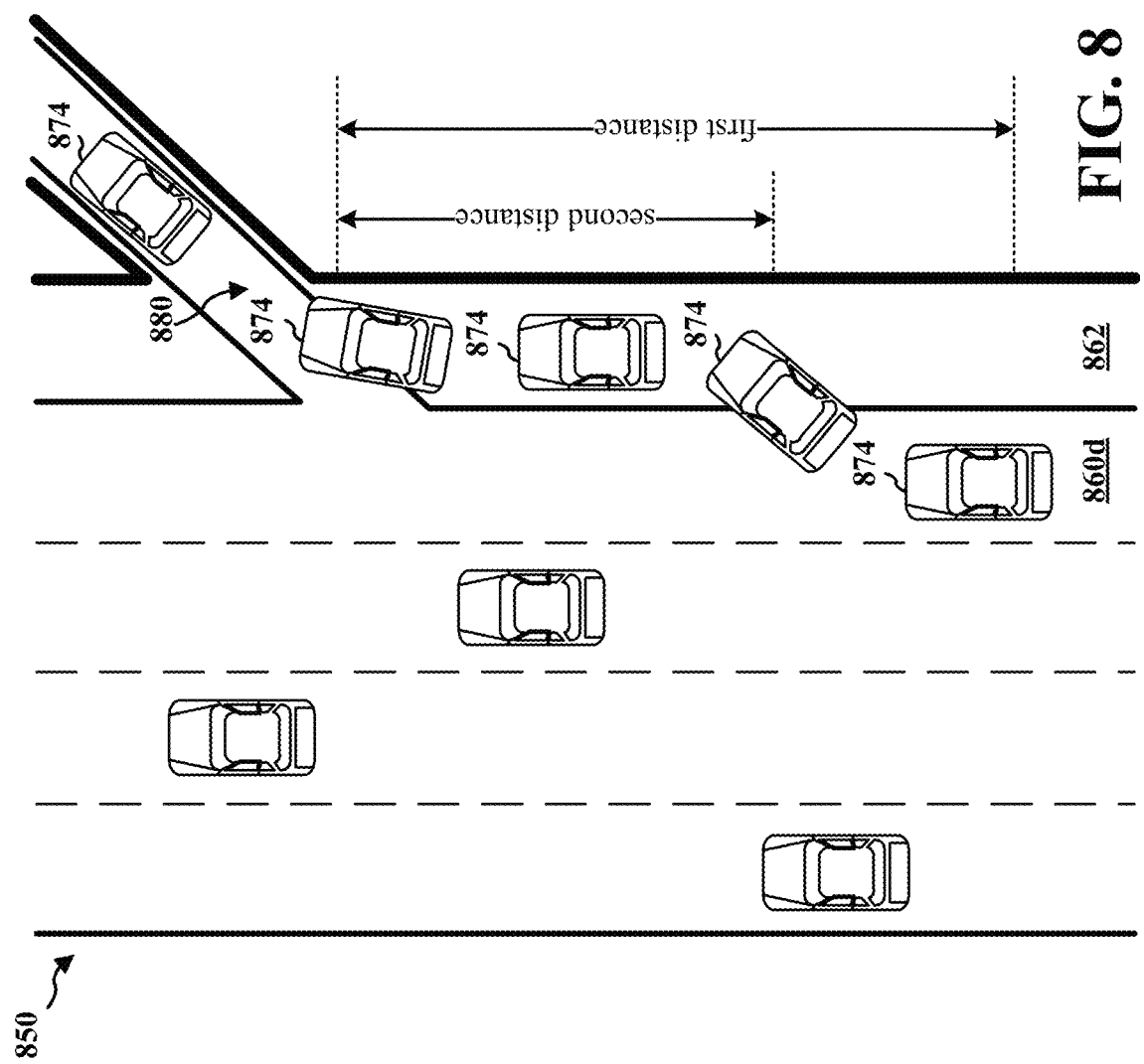
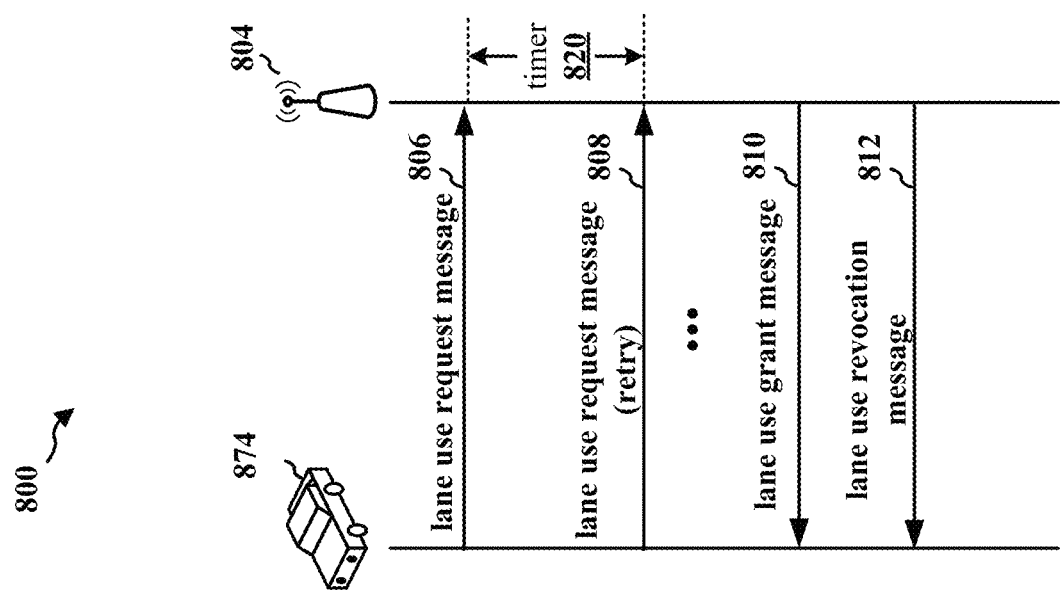
FIG. 8

SMART TRAFFIC MANAGEMENT

TECHNICAL FIELD

The present disclosure relates generally to communication systems, and more particularly, to a traffic management system utilizing wireless communication between a management network entity and one or more vehicles.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a vehicle. The apparatus may transmit, to a network entity, a lane use request message associated with a lane for the vehicle. The apparatus may receive, from the network entity, a lane use grant message based on at least one of lane information associated with the lane or vehicle information associated with the vehicle. The lane use grant message may be indicative of a permission for the vehicle to use the lane. The vehicle may not be permitted to use the lane without the permission.

In an aspect of the disclosure, a method, a computer-readable medium, and an apparatus are provided. The apparatus may be a network entity. The apparatus may identify lane information associated with a lane for a vehicle. The apparatus may identify vehicle information associated with the vehicle. The apparatus may transmit, to the vehicle, a lane use grant message based on at least one of the identified lane information or the identified vehicle information. The lane use grant message may be indicative of a permission for the vehicle to use the lane. The vehicle may not be permitted to use the lane without the permission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is an example diagram illustrating the lane use request and grant messages used with a road shoulder.

DETAILED DESCRIPTION

Figure 1:
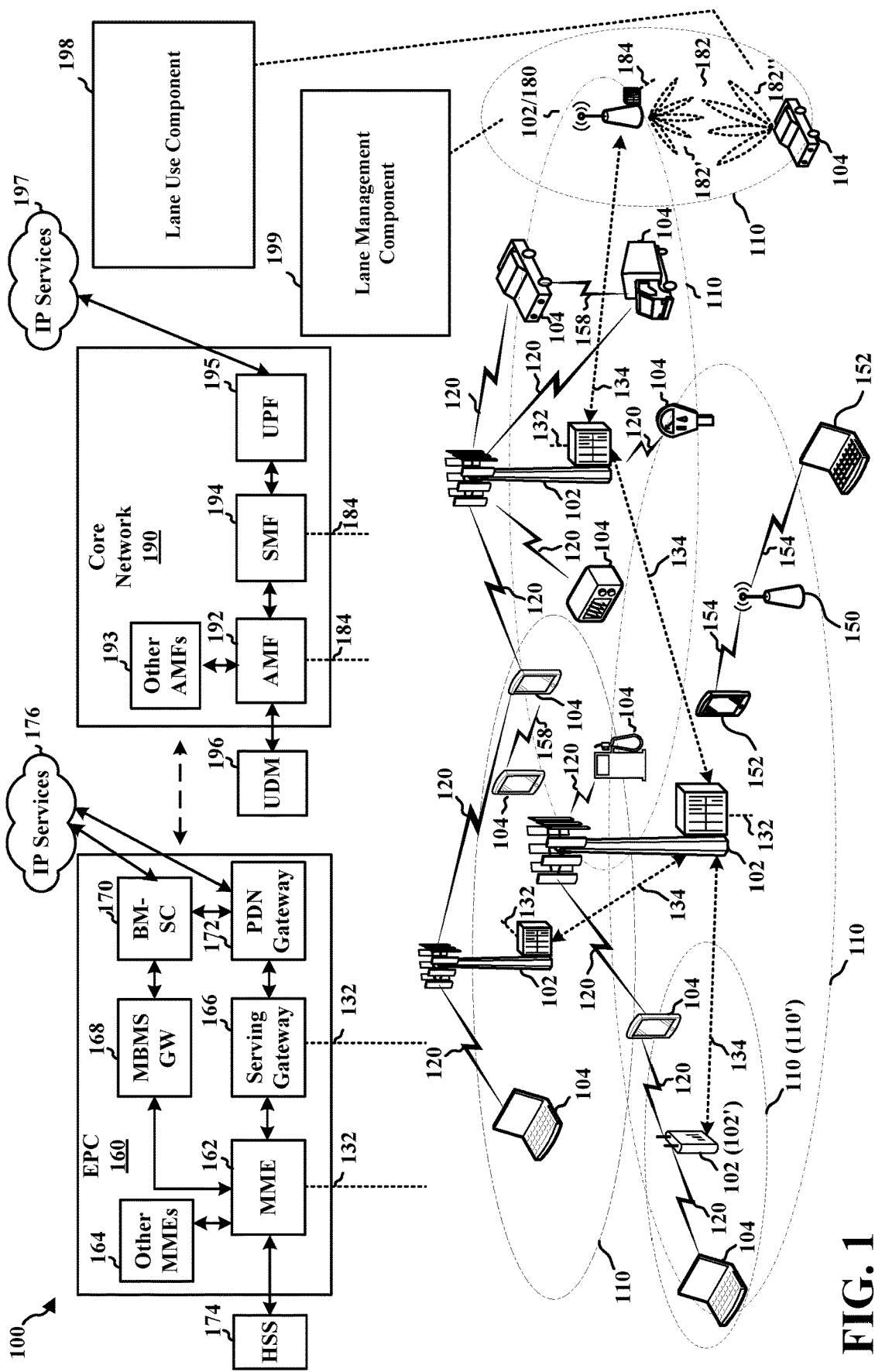
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE/vehicle 104 may include a lane use component 198 that may be configured to transmit, to a network entity, a lane use request message associated with a lane for the vehicle. The lane use component 198 may be configured to receive, from the network entity, a lane use grant message based on at least one of lane information associated with the lane or vehicle information associated with the vehicle. The lane use grant message may be indicative of a permission for the vehicle to use the lane. The vehicle may not be permitted to use the lane without the permission. In certain aspects, the base station/network entity 180 may include a lane management component 199 that may be configured to identify lane information associated with a lane for a vehicle. The lane management component 199 may be configured to identify vehicle information associated with the vehicle. The lane management component 199 may be configured to transmit, to the vehicle, a lane use grant message based on at least one of the identified lane information or the identified vehicle information. The lane use grant message may be indicative of a permission for the vehicle to use the lane. The vehicle may not be permitted to use the lane without the permission. Although the following description may be focused on 5G NR, the concepts described herein may be applicable to other similar areas, such as LTE, LTE-A, CDMA, GSM, and other wireless technologies.

Figure 2:
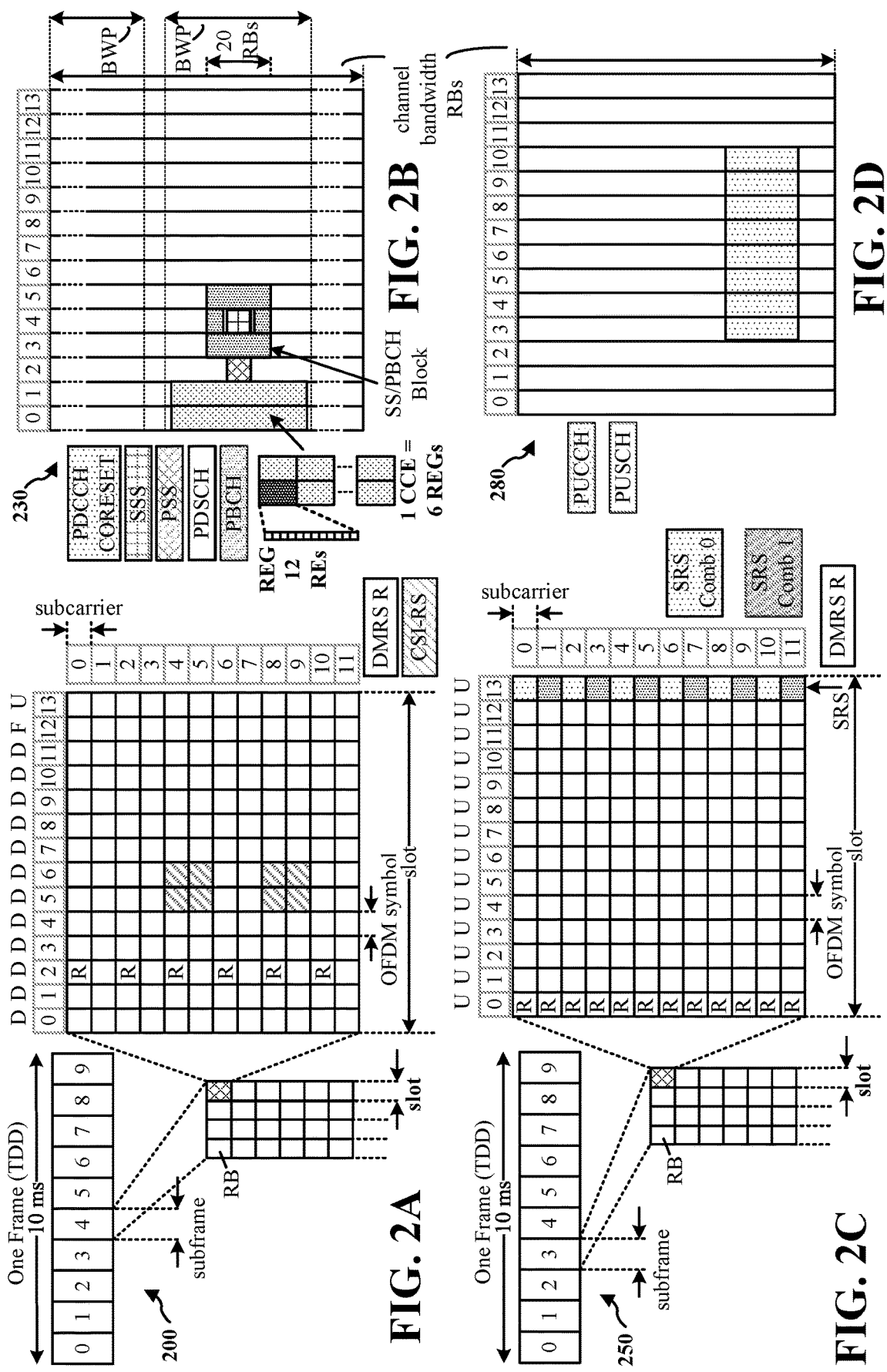
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
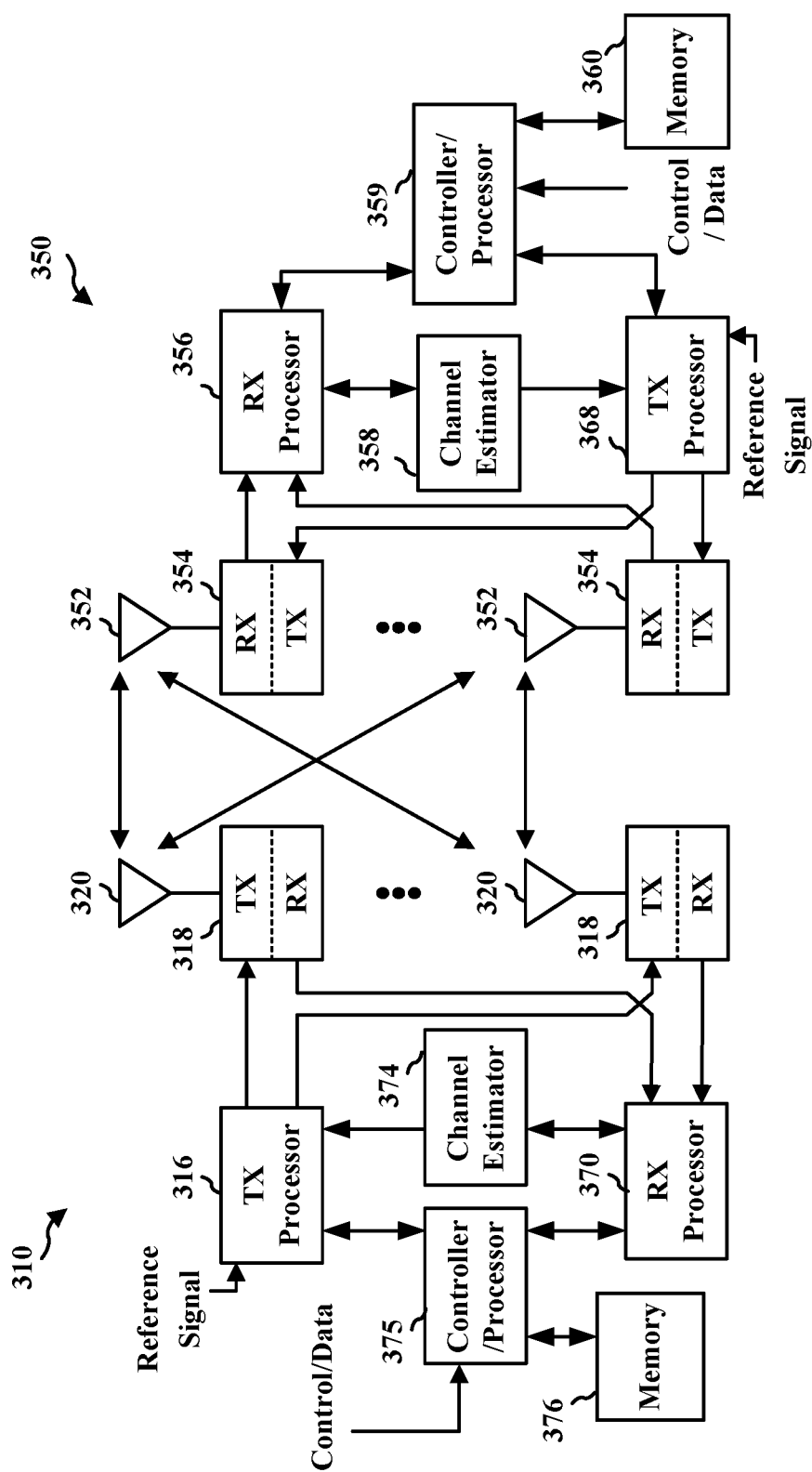
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

The cellular vehicle-to-everything (V2X) (C-V2X) technology may enable a vehicle to wirelessly communicate with other vehicles, roadside units (RSUs), or vulnerable road users (VRUs) within a range. In addition to supporting safety applications, the C-V2X technology, specifically the NR C-V2X, may be leveraged for advanced use cases such as cooperative driving or platooning. Further, the C-V2X technology may allow the road infrastructure to be used more efficiently and effectively to alleviate road congestion.

In one or more configurations, C-V2X signaling may be used to enable adaptive control of the directions of flexible direction lanes. Accordingly, manual intervention, which may be cumbersome, may be avoided in the changing of the lane direction. In one or more further configurations, C-V2X signaling may be used to enable the grant of permission to use a lane or a road on-demand where a vehicle is not otherwise permitted to use the lane or the road. For example, in an urgent situation, a sole passenger/driver in a vehicle may want to pay for the privilege of using a high occupancy vehicle (HOV) lane where the vehicle is not otherwise entitled to use the HOV lane because in general vehicles with a minimum of two passengers may use the HOV lane. Accordingly, in this example, once the payment is confirmed, a permission to use the HOV lane may be provided to the vehicle via C-V2X signaling.

In another configuration, C-V2X signaling may be used to communicate an updated road use rule to a vehicle. For example, based on the traffic condition, the minimum number of passengers in a vehicle that is permitted to use an HOV lane may be increased (e.g., from two to three), in order to reduce the load on the HOV lane. This updated HOV lane use rule may be communicated to the vehicles via C-V2X signaling.

In one or more aspects, the roadside message (RSM) may be enhanced to support dynamically changing the lane direction of one or more flexible direction lanes. For example, an RSM may be broadcasted to notify the vehicles of a currently permitted travel direction of a flexible direction lane. Further, based on the RSM, vehicles may be notified about upcoming lane closure or opening. In one or more aspects, a vehicle may transmit a message to a network entity (e.g., an RSU or a traffic management center (TMC)) to request a (temporary) permission to use a road or a lane (e.g., an HOV lane) that the vehicle is not otherwise permitted to use. In response, the network entity may, based on various factors, grant or deny the request by the vehicle for the permission to use the road or the lane.

In one or more configurations, the vehicle may be a fully autonomous vehicle (e.g., a vehicle with an automation level of 4 or above) or a manually driven vehicle having C-V2X capabilities and an automation level 2, 3 or below.

In one or more configurations, the network entity (e.g., the RSU or the TMC) may use the real time traffic information that may be available to adaptively change the travel direction of one or more flexible direction lanes.

Figure 4:
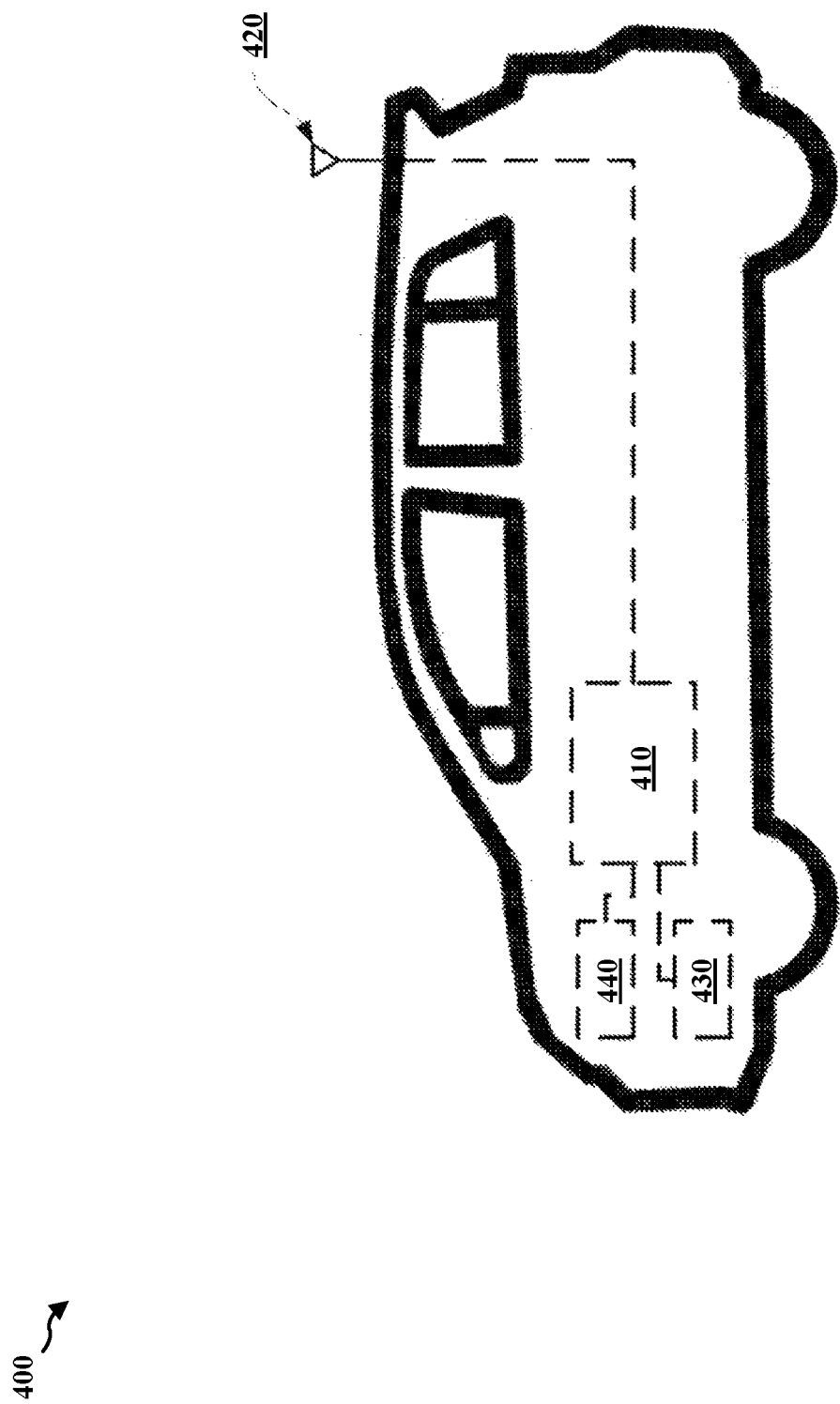
FIG. 4 shows an example system for smart traffic management.

FIG. 4 shows an example system for smart traffic management. In the example shown in FIG. 4, a vehicle 400 may be equipped with a computing device 410 in communication with an antenna 420 and one or more sensors 430 and 440. The computing device 410 may be configured to receive radio signals from the antenna 420, and in some examples, may be configured to transmit radio signals using the antenna 420. For example, the computing device 410 may be configured to transmit signals that may be employed by other suitable computing devices or a network entity (e.g., an RSU, a TMC, or a lane management system) according to different examples for smart traffic management. Such signals may include information such as a driving mode of the vehicle 400, an identifier for the vehicle 400 or computing device 410, one or more dimensions of the vehicle 400, a speed of the vehicle 400, a heading of the vehicle 400, or other information. It should be noted that the locations of the computing device 410 and the antenna 420 shown in FIG. 4 are merely examples, and in other examples, any suitable location within the vehicle 400 or other vehicle may be used.

As shown in FIG. 4, the vehicle 400 may be equipped with one or more sensors 430 and 440 of the same or different types. For example, sensors 430 may include optical sensors, e.g., light detection and ranging (LIDAR), or electromagnetic sensors, e.g., radio detection and ranging (RADAR). One or more such sensors may be configured to detect physical lane markers, such as indicators (e.g., stripes) painted on the road surface, or material embedded within the road surface, such as ferromagnetic materials, which may provide information to the computing device 410 that may be used to maintain a lane of travel, e.g., based on detections of lane boundaries, or change lanes. In some examples, sensors 440 may include proximity sensors configured to detect other vehicles. Example sensors may include image sensors, ultrasound range sensors, laser range sensors, radar, or other suitable proximity sensors. One or more sensors 430 and 440 may be affixed to the vehicle, such as on the front, sides, and rear of the vehicle. In some examples, one or more omnidirectional sensor(s) 430 and 440 may be affixed to the roof of the vehicle.

Figure 16:
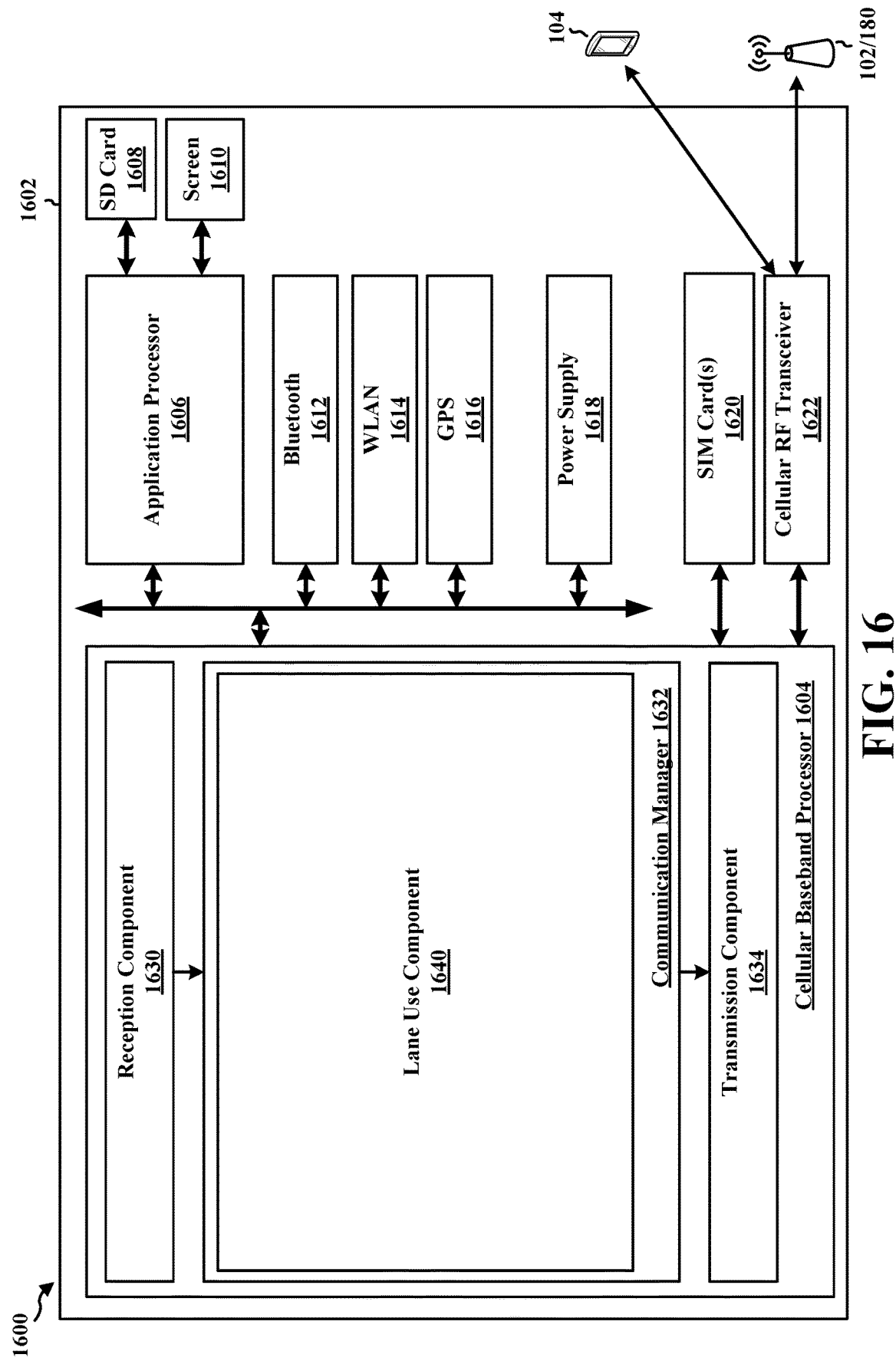
FIG. 16 is a diagram illustrating an example of a hardware implementation for an example apparatus.

The computing device 410 may further function as, or be in communication with, a navigation system of the vehicle 400. The computing device 410 may be configured in some examples to access navigation information, such as preprogrammed route information or location information that may be employed for smart traffic management. FIG. 16 below may show a more detailed view of the example computing device 410 shown in FIG. 4.

Figure 5:
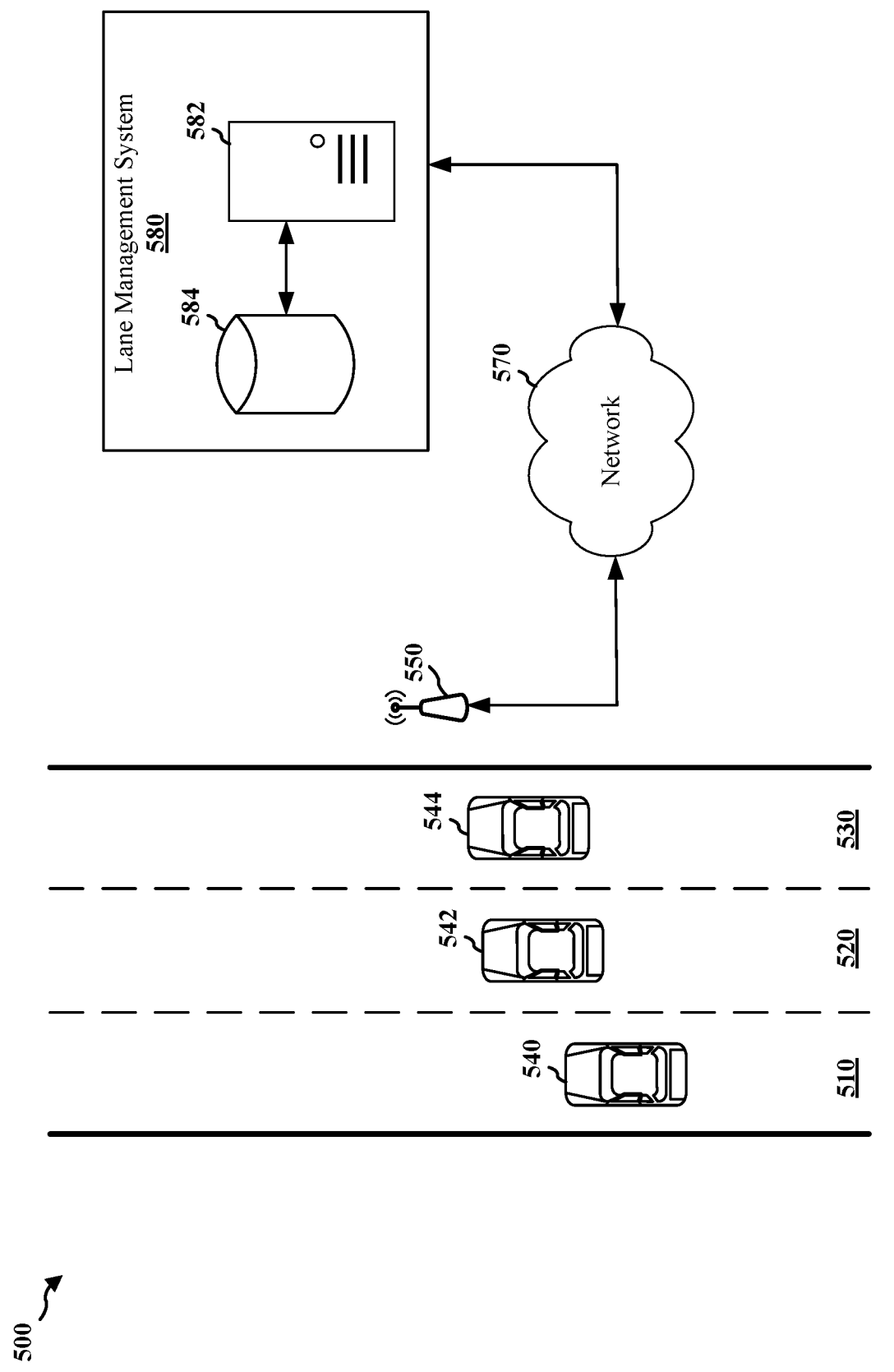
FIG. 5 shows an example lane management system in communication with a plurality of vehicles traveling in lanes via a network in communication with a wireless communication node.

FIG. 5 shows an example lane management system 580 in communication with a plurality of vehicles 540, 542, and 544 traveling in lanes 510, 520, and 530, respectively via a network 570 in communication with a wireless communication node 550 (e.g., an RSU). The lane management system 580 may include at least one lane management server 582 and at least one data store 584. The lane management system 580 may be configured to perform one or more methods according to this disclosure.

In the system shown in FIG. 5, suitable computing devices disposed within vehicles 540, 542, and 544 may be in communication with the lane management system 580 via the wireless communication node 550, which may be a cellular antenna, a wireless AP, an RSU, or another wireless transceiver device. The wireless communication node 550 may be configured to communicate with one or more of the vehicles 540, 542, and 544 (e.g., with the on-board units (OBUs) or the on-board equipment (OBE) of the vehicles 540, 542, and 544), such as to provide a broadcast or point-to-point signal usable by one or more of the vehicles 540, 542, and 544 for grant of lane use permission, and to receive signals from one or more of the vehicles 540, 542, and 544 to provide information to the lane management system 580, or to receive information from the lane management system 580. For example, a vehicle may request a lane for use on the road 500. Herein the lane management system 580 may correspond to a TMC. Further, a network entity may refer to one or more of the lane management system 580 (e.g., a TMC), the lane management server 582, or the wireless communication node 550 (e.g., an RSU).

Figure 6:
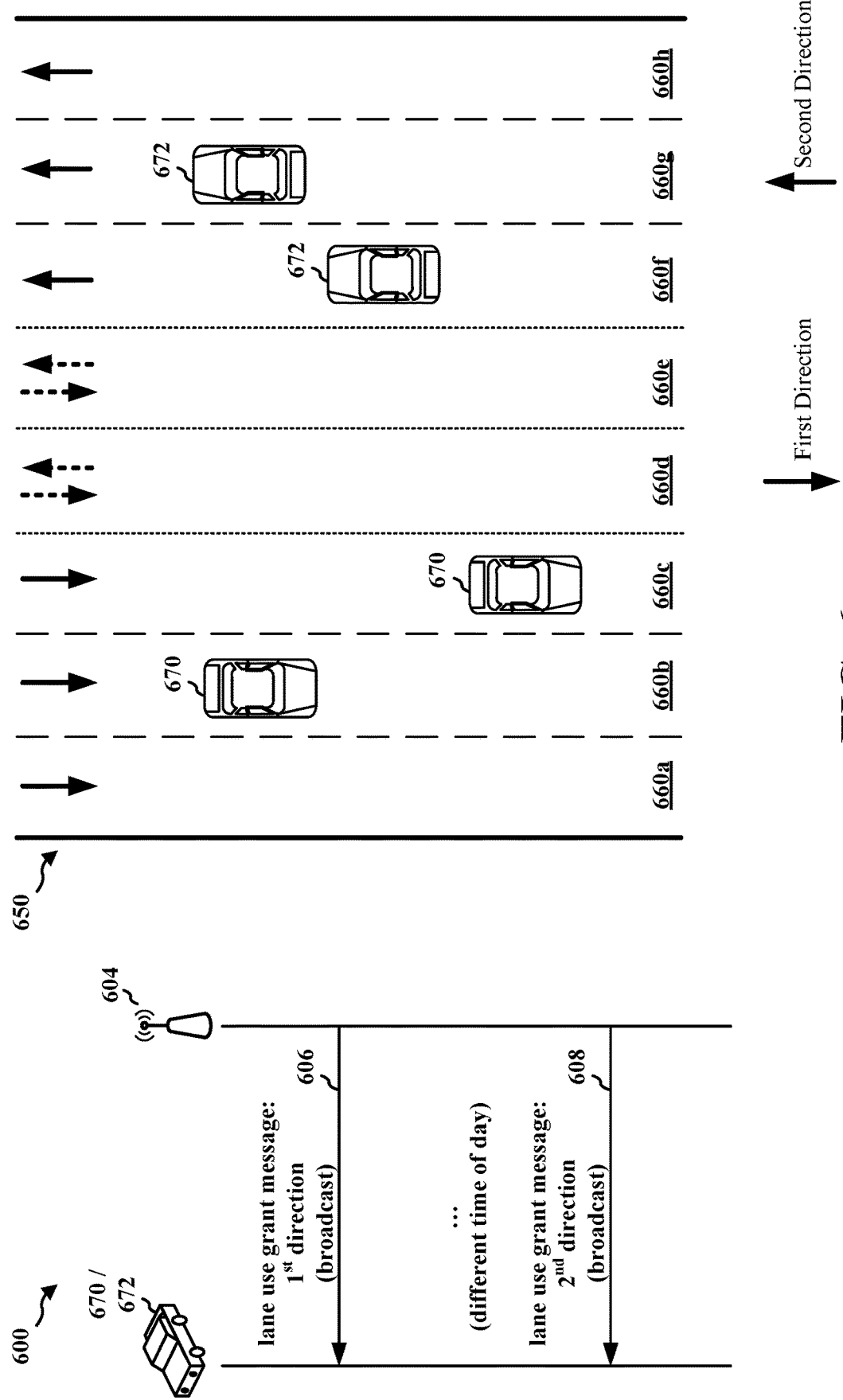
FIG. 6 is an example diagram illustrating the lane use grant message used with flexible direction lanes.

FIG. 6 is an example diagram illustrating the lane use grant message used with flexible direction lanes. In the example road environment 650, the lanes 660a, 660b, and 660c may be associated with the first travel direction (e.g., the southbound direction), and the lanes 660f, 660g, and 660h may be associated with a second travel direction (e.g., the northbound direction) opposite of the first travel direction. In some examples, the flexible direction lanes 660d and 660e may be located between the lanes for the two opposite directions. Each flexible direction lane 660d or 660e may be configured by a network entity with one or the other travel direction between the first direction and the second direction. For example, both flexible direction lanes 660d and 660e may be configured with the first direction or the second direction. In another example, the flexible direction lane 660d may be configured with the first direction, and the flexible direction lane 660e may be configured with the second direction. In one or more configurations, the network entity may configure the directions of the flexible direction lanes 660d and 660e based on at least one of a traffic condition (e.g., whether there is congestion in either travel direction) or a time of day. For example, if it is observed that more vehicles travel in the first direction during the morning rush hours, the network entity may configure both the flexible direction lanes 660d and 660e with the first travel direction during the morning rush hours. Therefore, by adjusting the travel direction of one or more flexible direction lanes, the network entity may, within bounds, adjust the total number of lanes that may be used for travel in either direction.

In one configuration, the network entity (e.g., an RSU, a TMC, or a TMC through an RSU) may broadcast an indication of a travel direction of a flexible direction lane to all vehicles in range. The diagram 600 is a communication flow between a network entity 604 and one or more vehicles 670/672. For example, at 606, the network entity 604 may broadcast an indication that a flexible direction lane (e.g., the flexible direction lane 660d or both flexible direction lanes 660d and 660e) is configured with the first travel direction. In one or more configurations, the message 606 may be an RSM. All vehicles 670/672 in range may receive the broadcast message. However, vehicles not traveling in the first direction (e.g., vehicles 672) may disregard the message. On the other hand, vehicles traveling in the first direction (e.g., vehicles 670) may treat message 606 as a lane use grant message permitting the vehicles traveling in the first direction to use the flexible direction lane referred to in or associated with the message 606.

In some examples, if a vehicle permitted to use a flexible direction lane is a fully autonomous vehicle (e.g., a vehicle capable of full self-driving (FSD)), the autonomous driving system of the vehicle may take the permission to use the flexible direction lane into consideration when driving the vehicle. For example, the vehicle may autonomously choose to perform a lane change and use the flexible direction lane. In some other examples, if a vehicle permitted to use the flexible direction lane is not fully autonomous (i.e., the vehicle is manually driven), the vehicle may provide a prompt (e.g., a visual and/or audible indication, or other suitable indication) to a driver or user of the vehicle to notify the driver or user that the flexible direction lane is usable.

In some examples, at a different time of day, at 608, the network entity 604 may broadcast an indication that a flexible direction lane (e.g., the flexible direction lane 660e or both flexible direction lanes 660d and 660e) is configured with the second travel direction. Accordingly, at that time, vehicles traveling in the second direction (e.g., vehicles 672) may treat message 608 as a lane use grant message permitting the vehicles traveling in the second direction to use the flexible direction lane referred to in or associated with the message 608.

In some examples, instead of broadcasting an indication of the configured travel direction of a flexible direction lane, the network entity may first identify one or more vehicles currently traveling in the configured travel direction of the flexible direction lane, and may transmit the lane use grant message indicating the permission to use the flexible direction lane concerned to these vehicles via unicast or groupcast.

In one or more configurations, a network entity (e.g., an RSU, a TMC, or a TMC through one or more RSUs) may transmit (e.g., via broadcast, groupcast, or unicast) a lane use grant message to one or more vehicles to indicate to the one or more vehicles a permission to use one or more lanes (e.g., a flexible direction lane, an emergency lane, a road shoulder, an HOV lane, etc.) that the vehicles are not permitted to use without the express permission from the network entity. In some examples, the network entity may provide such lane/road use permission to offload excess traffic on main lanes. In particular, in one configuration, the network entity (e.g., the TMC) may have knowledge about the vehicles using the road based on messages (e.g., broadcast messages) received from the vehicles. Accordingly, if the network entity deems it suitable, the network entity may select one or more suitable vehicles, and may transmit (unsolicitedly) the lane use grant message to the selected one or more vehicles (e.g., via unicast or groupcast), so that these vehicles may learn about the permission to use the lanes that these vehicles are not permitted to use without the express permission from the network entity.

In some configurations, the network entity may permit a vehicle that is not associated with a paid user status or does not meet another condition (e.g., carrying more than two passengers) to use a lane or road that is otherwise reserved for vehicles that are associated with a paid user status or meet certain conditions. In some configurations, the network entity may permit a vehicle to use a lane or road that is reserved for vehicles that are associated with a paid user status or meet certain conditions based on identifying that the vehicle is associated with a paid user status or meets the conditions. In particular, the network entity may identify a vehicle based on one or more of a self-identification based on V-C2X signaling, a sticker, a tag, a license plate, a transponder, etc. The network entity may identify the vehicle using one or more such techniques as machine vision, optical character recognition (OCR), etc.

Figure 7:
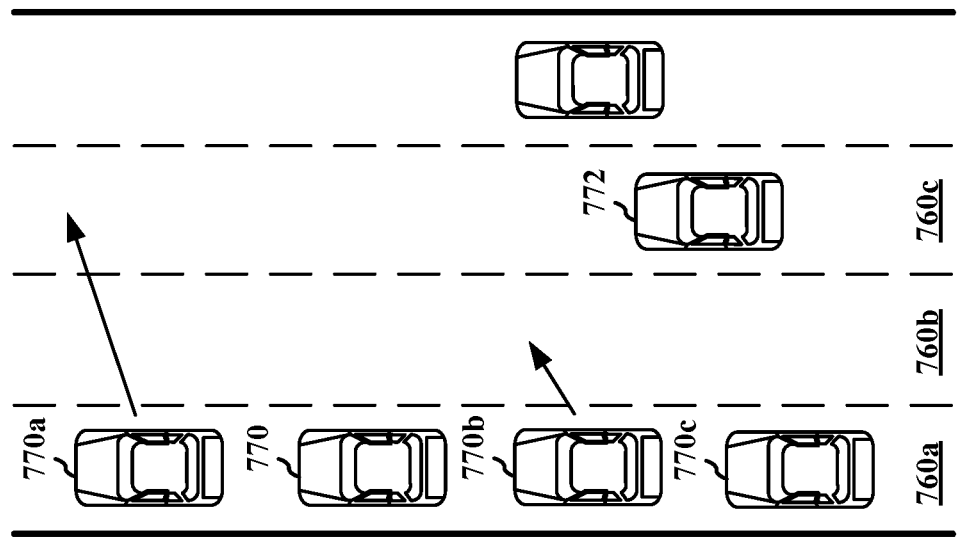
FIG. 7 is a diagram illustrating an example road environment.

FIG. 7 is a diagram illustrating an example road environment 700. In one or more configurations, a network entity may transmit lane use grant messages to vehicles in order to perform traffic balancing among regular lanes. For example, if a network entity (e.g., a TMC and/or one or more RSUs, which may be camera-equipped) determines that some lanes are more heavily occupied than other lanes (e.g., the difference in occupancy may be greater than a threshold), the network entity may transmit a lane use grant message to vehicles in the more heavily occupied lanes to direct these vehicles to change lanes and use the less occupied lanes instead. The traffic condition in the more heavily occupied lanes may not need to rise to the level of congestion for the network entity to proactively perform such traffic balancing in order to mitigate or avoid a potential future congestion. Further, a more balanced use of the lanes may help to prevent slowdowns and/or hard braking in more heavily occupied lanes.

As shown in FIG. 7, four vehicles (e.g., vehicle 770, vehicle 770a, vehicle 770b, and vehicle 770c) may be using the lane 760a. No vehicle is using the lane 760b. Further, one vehicle 772 is using the lane 760c. Therefore, the lane 760a may be a more heavily occupied lane than either the lane 760b or the lane 760c. Accordingly, the network entity may select the vehicle 770a, and may transmit a lane use grant message to the vehicle 770a to direct the vehicle 770a to use the less occupied lane 760c. Similarly, the network entity may select the vehicle 770b, and may transmit a lane use grant message to the vehicle 770b to direct the vehicle 770b to use the less occupied lane 760b. Therefore, the lane usage among the four lanes illustrated in FIG. 7 may become more balanced after the vehicles 770a and 770b have completed the lane changes (e.g., autonomously or through human drivers changing lanes) as directed by the network entity as no lane is used by more than two vehicles subsequent to the lane changes.

In one configuration, the traffic balancing may be performed between regular lanes and truck lanes. For example, a network entity may, based on a lane use grant message transmitted to the non-truck vehicle, direct a non-truck vehicle traveling in a more heavily occupied regular lane to use a less occupied truck lane instead.

FIG. 8 is an example diagram illustrating the lane use request and grant messages used with a road shoulder. In one or more configurations, a vehicle (e.g., an OBU/OBE or an application running therein) may choose to request a permission from a network entity to use a lane or a road (e.g., an HOV lane, an emergency lane, a road shoulder, etc.) that the vehicle is not permitted to use without the express permission from the network entity. The lane or the road may be referred to as a special lane or road. In particular, the vehicle may choose to request the permission based on one or more factors. For example, the factors may include, but are not limited to, a route to the destination, a traffic condition (e.g., whether there is a congestion) between the current location and the destination, or an accident or incident status associated with the route to the destination (which may be based on information received (e.g., via RSMs) from one or more network entities).

The diagram 800 illustrates a communication flow between the vehicle 874 and a network entity 804. In particular, in some examples, to request the permission, at 806, the vehicle 874 (e.g., in particular, the OBU/OBE) may transmit (e.g., broadcast) a lane use request message to the network entity 804 (e.g., one or more RSUs nearby, which may be installed along the road). In some examples, one or more RSUs may receive the lane use request message from the vehicle 874, and may forward the lane use request message to a TMC. The lane use request message may be a wireless access in vehicular environments (WAVE) short message (WSM). A WSM may follow the WSM protocol (WSMP). In some examples, the lane use request message may also be referred to as a special lane usage message (SLUM). If after transmitting the lane use request message 806, the vehicle 874 does not receive a message acknowledging the lane use request message 806 (e.g., a SLUM acknowledgement (SLUMAck)) before a timer 820 expires, at 808, the vehicle 874 may retransmit one or more lane use request messages to the network entity 804. In one or more configurations, the vehicle 874 may retransmit a lane use request message to the network entity upon each expiry of the timer 820 until a message acknowledging the lane use request message is received or until the permission to use the lane or the road is no longer sought by the vehicle 874.

In one configuration, as shown in the road environment 850, the vehicle 874 traveling in the lane 860d may expect to exit the road soon at the exit 880, and the lane or the road which the vehicle 874 may request the permission to use may be a road shoulder 862 at the edge of the road, so that the vehicle 874 may move into and travel on the road shoulder 862 before the vehicle 874 takes the exit 880. Accordingly, the lane use request message 806 or the retransmissions thereof may include an indication of a first distance, which may be the current distance between the vehicle 874 and the exit 880. It should be appreciated that FIG. 8 shows a same vehicle 874 at several different time instances during the process of exiting the road.

In one or more configurations, in response to the lane use request message from the vehicle 874, the network entity 804 (e.g., the TMC) may decide whether or not to grant to the vehicle 874 the permission to use the lane or the road based on one or more factors. In different examples, the factors may include, but are not limited to, a paid user status of the vehicle 874 (e.g., if the lane or the road the vehicle 874 is requesting permission to use is reserved for vehicles that have the paid user status), whether the lane or the road is used or is expected to be used by an emergency vehicle, or any other suitable assessment factor.

The network entity 804 may transmit, to the vehicle 874, a message acknowledging the lane use request message. The message acknowledging the lane use request message may include an indication of a grant or a denial of the request by the vehicle 874 for permission to use the lane or the road. In one or more examples, the network entity 804 may transmit, to the vehicle 874, the message acknowledging the lane use request message via unicast. If the message acknowledging the lane use request message indicates a grant of the request, the message acknowledging the lane use request message may be the lane use grant message 810 transmitted from the network entity 804 to the vehicle 874. In one or more configurations, the lane use grant message 810 may include an indication of a validity range (e.g., coordinates or other indicators of locations associated with the two ends of the segment of the lane or the road for which the permission is granted) or validity distance associated with the permission to use the lane or the road. The vehicle 874 may be permitted to use the special lane or the special road based on the validity range or validity distance, and may leave the special lane or the special road and return to the regular lanes when the vehicle 874 travels beyond the validity range or validity distance. In the above example where the vehicle 874 is requesting the permission to use the road shoulder 862 before exiting the road, the validity range or validity distance associated with the permission to use the road shoulder 862 may correspond to a segment of the road shoulder 862 that may precede the exit 880 and may be away from the exit 880 by up to a second distance. In some examples, the second distance may be shorter than the first distance.

In one or more configurations, if the message acknowledging the lane use request message indicates a denial of the request, the vehicle 874 may restart the transmission of the lane use request message after the expiry of a second timer. The duration of the second timer may be the same as, or may be different from, the duration of the timer 820. For example, the duration of the second timer may be greater than the duration of the timer 820.

In one or more configurations, one or more network entities (e.g., RSUs or TMCs) may use machine learning or artificial intelligence algorithms to learn the peak and non-peak times of the day on specific roads. Therefore, in some examples, during non-peak hours, when there is congestion on the main road, in order to alleviate the congestion, the network entity may broadcast a lane use grant message to vehicles in range to permit the vehicles to use one or more emergency lanes (or HOV lanes, road shoulders, etc.), which the vehicles may not be permitted to use without the express permission from the network entity. In some examples, the permission to use emergency lanes under such circumstances may be provided to the vehicles that have the paid user status. In some examples, the price for using these lanes during non-peak hours may be less than the price for using these lanes during peak hours. Therefore, in some examples, during peak hours, the network entities may transmit the lane use grant message to vehicles that have a premium paid user status (which may correspond to a higher price) via unicast irrespective of the traffic condition on the main roads. Because a limited number of vehicles that have the premium paid user status may be permitted to use the emergency lanes, the emergency lanes may not be congested during peak hours even though such permissions are provided to some vehicles.

In one or more configurations, network entities (e.g., RSUs) may detect one or more approaching emergency vehicles (e.g., police vehicles, ambulances, fire engines, etc.). In one or more configurations, network entities (e.g., RSUs) may be deployed with highly directional narrow beam high gain antennas to identify an emergency vehicle approaching while the emergency vehicle is still a distance away. Therefore, in some examples, based on the expected use of the emergency lanes by the approaching emergency vehicle, the network entities may revoke the permissions to use the emergency lanes by non-emergency vehicles and clear all non-emergency vehicles from the emergency lanes. For example, at 812, based on the expected use of the road shoulder 862 by an approaching emergency vehicle, the network entity 804 may transmit a lane use revocation message 812 to the vehicle 874 to immediately revoke the permission to use the road shoulder 862 by the vehicle 874. Accordingly, based on the lane use revocation message 812, the vehicle 874 may leave the road shoulder 862 and return to one of the regular lanes (e.g., the lane 860d) as soon as practicable.

Figure 9:
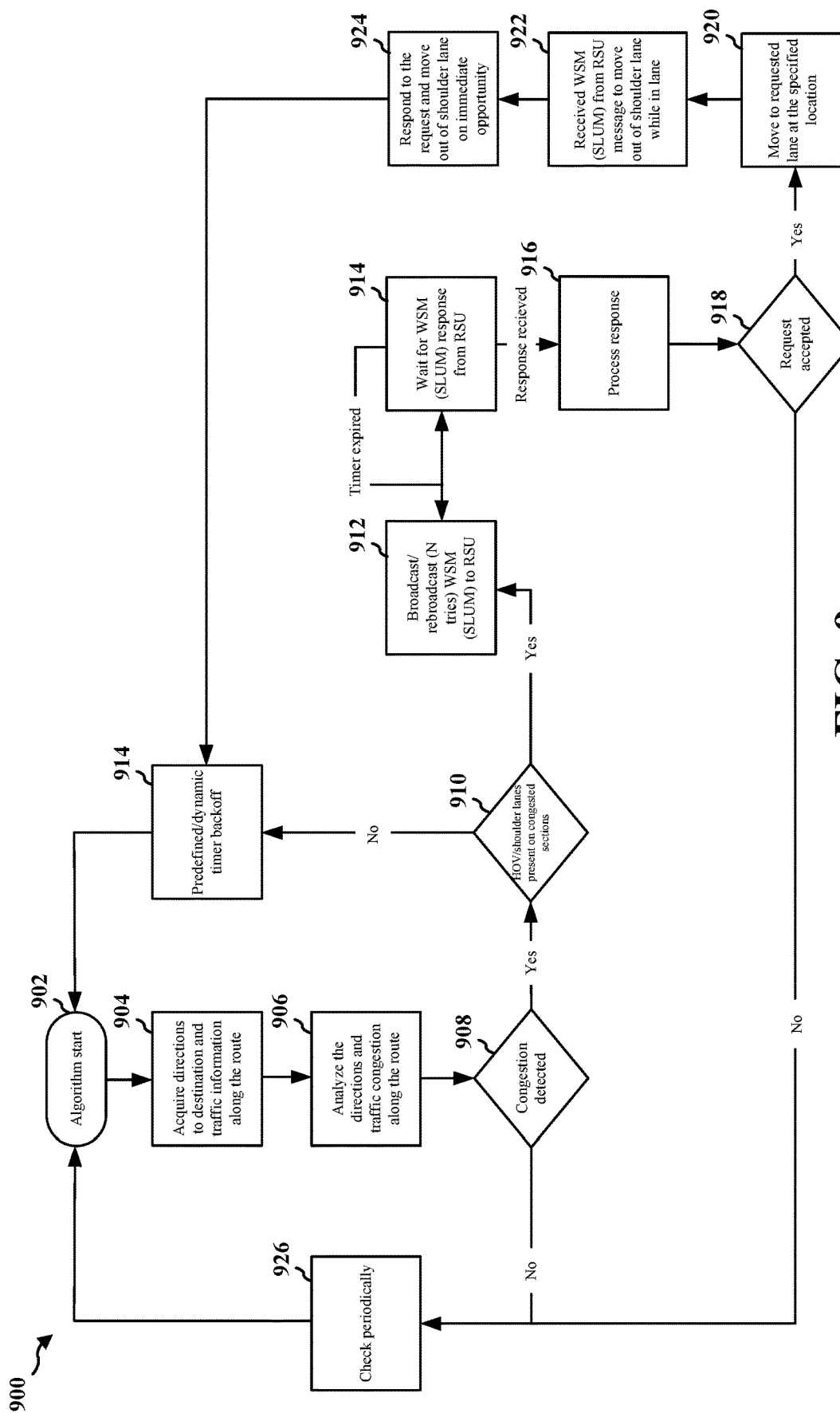
FIG. 9 is a flowchart of an example method of V2X communication.

FIG. 9 is a flowchart of an example method 900 of V2X communication. The process 900 may be performed at a vehicle (e.g., the UE/vehicle 104/350; the vehicle 400/540/542/544/670/672/770/772/874/1102; the apparatus 1602). At 902, the algorithm may start. At 904, the vehicle may acquire directions to the destination and traffic information along the route. At 906, the vehicle may analyze the directions and the potential traffic congestion along the route.

If congestion is detected along the route, the process may proceed to 910 at 908. At 910, the vehicle may determine whether special lanes (e.g., HOV lanes or shoulder lanes) are present on the congested sections of the route. If the special lanes are present, at 912, the vehicle may broadcast a SLUM via an WSM to one or more RSUs. At 914, the vehicle may wait for the SLUM response (e.g., a SLUMAck) from at least one of the RSUs. If no SLUM response is received before a timer (e.g., the timer 820) expires, the vehicle may rebroadcast the SLUM via an WSM at 912, and may wait for the SLUM response again at 914. The vehicle may rebroadcast the SLUM for a preconfigured number of times (e.g., N tries) at 912 if the vehicle does not receive a SLUM response at 914 before the timer expires after each rebroadcast of the SLUM.

If a SLUM response is received, at 916, the vehicle may process the SLUM response. At 918, the vehicle may determine whether the lane use request has been accepted (e.g., whether the SLUM response indicates a grant of permission). If the lane use request has been accepted, at 920, the vehicle may move into the requested lane (e.g., a special lane such as an HOV or a road shoulder) at the specified location based on the grant of permission received from the network entity. At 922, the vehicle may receive a lane use revocation message (which may be a SLUM via an WSM) from an RSU. The lane use revocation message may direct the vehicle to move out of the special lane (e.g., an HOV or a road shoulder) if the vehicle is traveling in the special lane. At 924, the vehicle may respond to the lane use revocation message, and may move out of the special lane at the first practical opportunity. Thereafter, the process may return to 902 after a backoff timer 914 expires. In different examples, the backoff timer 914 may be predefined or dynamic.

If no congestion is detected along the route at 908, or if the lane use request has not been accepted at 918, the process may return to 902 via 926. Based on 926, the process 900 may be performed periodically. Further, if the vehicle determines that no special lanes are present on the congested sections of the route, the process may return to 902 after the backoff timer 914 expires.

Figure 10:
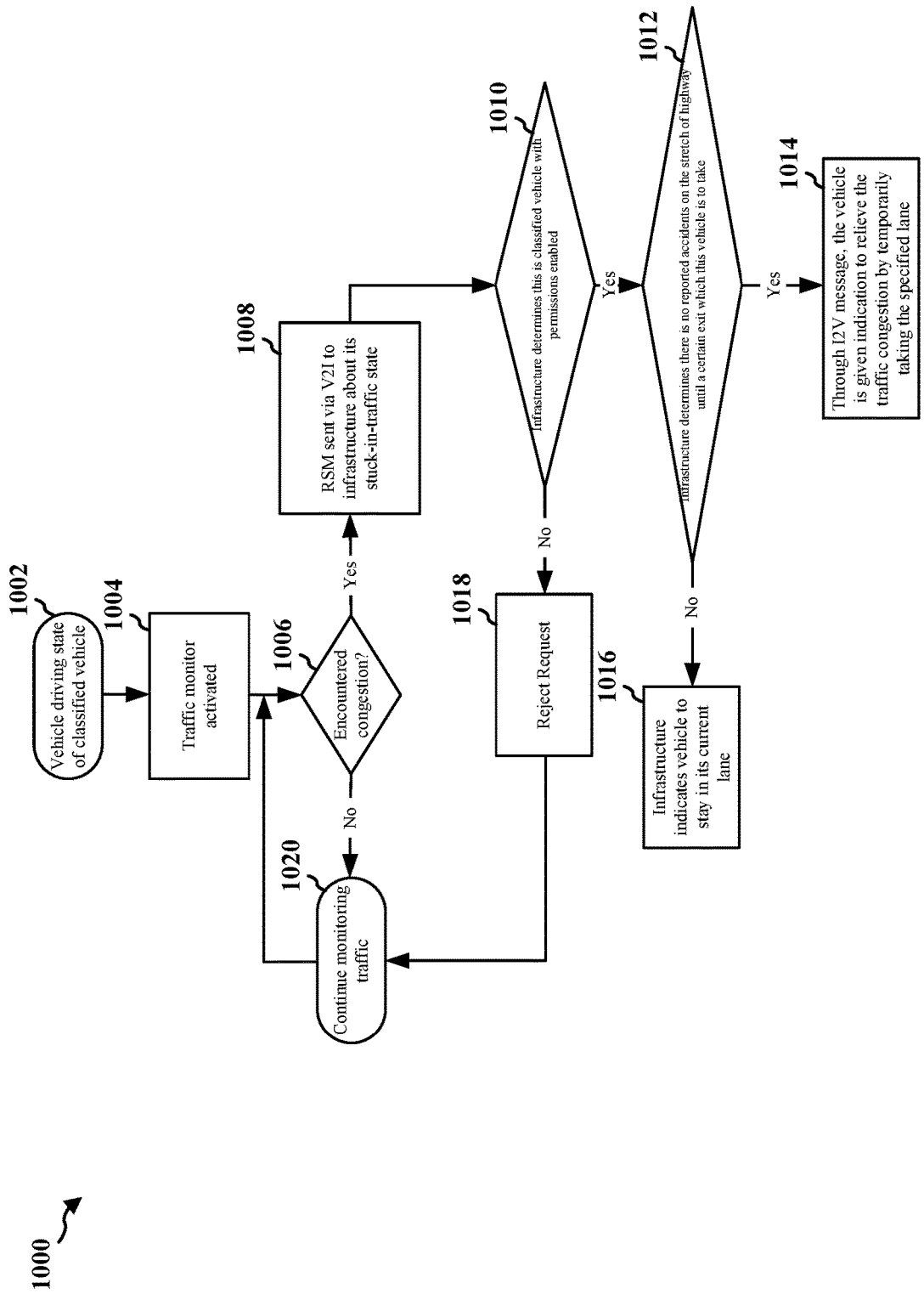
FIG. 10 is a flowchart of an example method of V2X communication.

FIG. 10 is a flowchart of an example method 1000 of V2X communication. The process 1000 may be performed by a vehicle (e.g., the UE/vehicle 104/350; the vehicle 400/540/542/544/670/672/770/772/874/1102; the apparatus 1602). At 1002, the vehicle may identify the driving state of the vehicle. At 1004, the vehicle may activate traffic monitoring. At 1006, the vehicle may determine whether there is congestion. If there is congestion, at 1008, the vehicle may transmit an RSM (e.g., a vehicle-to-infrastructure (V2I) message) to a network entity (e.g., infrastructure), where the RSM may indicate that the vehicle is encountering congestion (e.g., stuck in traffic).

At 1010, the network entity may determine whether the vehicle is eligible for permission to use a special lane (e.g., whether the vehicle has a paid user status). If the vehicle is eligible, at 1012, the network entity may determine whether the section of the highway between where the vehicle currently is and the exit the vehicle is expected to take is accident- or incident-free. If the highway section is accident- or incident-free, at 1014, the network entity may transmit an infrastructure-to-vehicle (I2V) message to the vehicle to indicate that the vehicle is permitted to use the special lane. Accordingly, the vehicle may move into the special lane based on the permission in order to move through the congested road section in less time. If the highway section is determined as not being accident- or incident-free at 1012, at 1016, the network entity may instruct the vehicle to stay in the regular lanes (e.g., the lane currently used by the vehicle).

If the vehicle is determined as not being eligible for permission to use a special lane at 1010, at 1018, the network entity may transmit a message to the vehicle to indicate that the request by the vehicle to use the special lane is rejected. Thereafter, the process may continue to monitor the traffic condition at 1020, and may return to 1006 to determine whether there is congestion.

Figure 11:
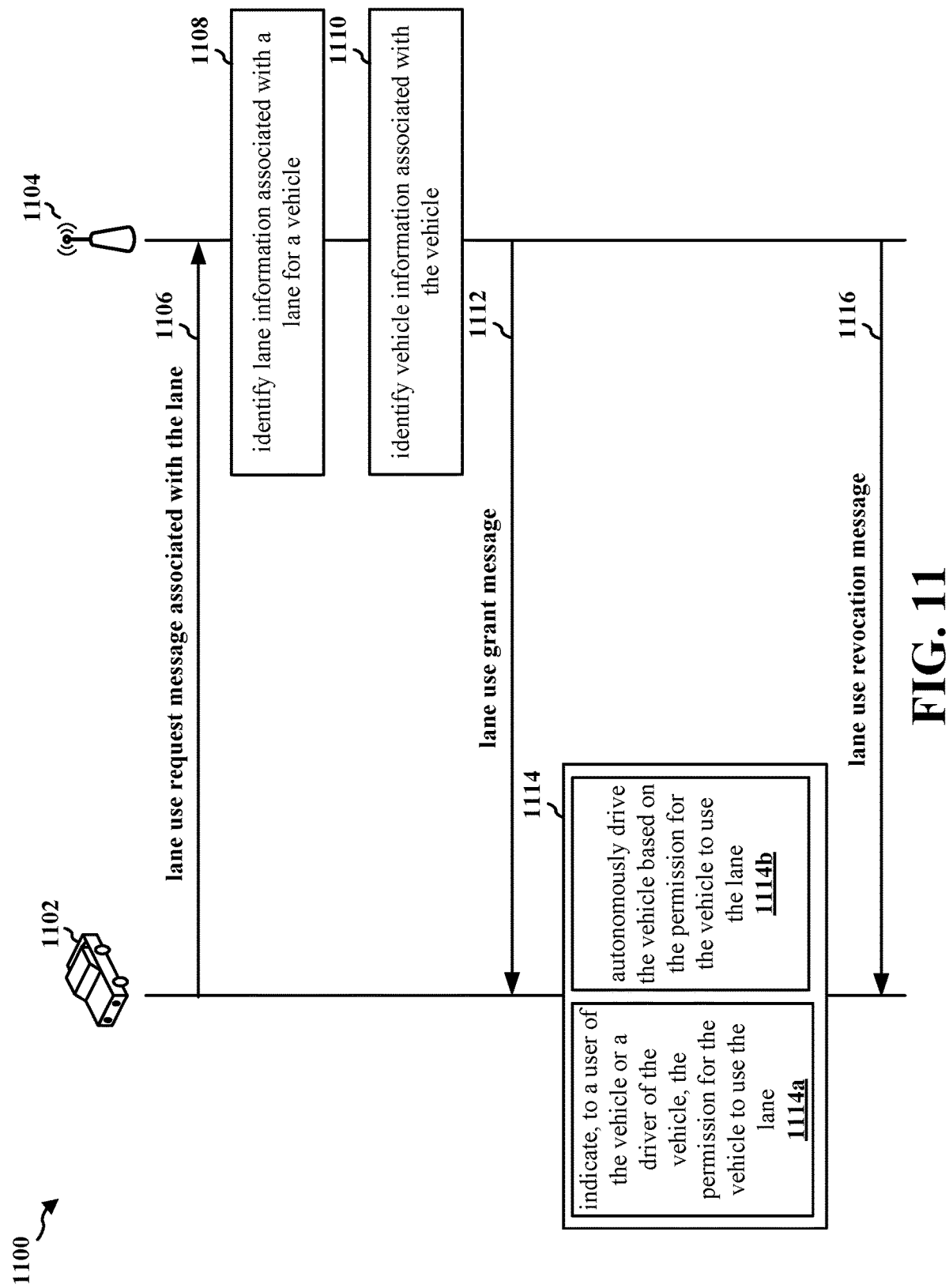
FIG. 11 is a diagram of a communication flow of a method of wireless communication.

FIG. 11 is a diagram of a communication flow 1100 of a method of wireless communication. At 1106, the vehicle 1102 may transmit, to a network entity 1104, and the network entity 1104 may receive, from the vehicle 1102, a lane use request message associated with a lane for the vehicle 1102. In one configuration, the lane use request message may be transmitted to the network entity 1104 via a first WSM.

At 1108, the network entity 1104 may identify lane information associated with a lane for a vehicle 1102. In one configuration, the network entity 1104 may correspond to at least one of an RSU, a TMC, or a server.

At 1110, the network entity 1104 may identify vehicle information associated with the vehicle 1102.

At 1112, the network entity 1104 may transmit, to the vehicle 1102, and the vehicle 1102 may receive, from the network entity 1104, a lane use grant message based on at least one of the identified lane information or the identified vehicle information. The lane use grant message may be indicative of a permission for the vehicle 1102 to use the lane. The vehicle 1102 may not be permitted to use the lane without the permission. In one configuration, the lane use grant message may be received from the network entity 1104 via an RSM or a second WSM.

In one configuration, the lane may correspond to a flexible direction lane, an emergency lane, a road shoulder, an HOV lane, or a passing lane.

In one configuration, the lane may be associated with configurable lane directions. The lane information may include a present lane direction associated with the lane. The vehicle information may include a present vehicle direction associated with the vehicle. The lane use grant message may be based on the present vehicle direction being consistent with the present lane direction.

In one configuration, the present lane direction may be based on at least one of a traffic condition or a time of day.

In one configuration, the lane information may include a present use or nonuse of the lane or a predicted use or nonuse of the lane by at least one emergency vehicle. The lane use grant message may be based on the lane not being used and not being expected to be used by the at least one emergency vehicle.

In one configuration, the lane may correspond to the road shoulder. The vehicle information may include an indication of an upcoming exit by the vehicle from a road associated with the road shoulder. The lane use grant message may be based on the vehicle being expected to exit the road within a predefined first distance.

In one configuration, the lane use grant message may be further indicative of a predefined second distance associated with the permission for the vehicle to use the lane. The predefined second distance may be less than the predefined first distance.

In one configuration, the indication of the upcoming exit may be associated with the lane use request message.

In one configuration, the lane information may include a traffic condition associated with the lane. The lane use grant message may be based on the lane being used by fewer vehicles than a second lane that is used by the vehicle prior to the transmission or reception of the lane use grant message.

In one configuration, the vehicle information may include a payment status associated with the vehicle. The lane use grant message may be based on the vehicle being associated with a payment for use of the lane.

In one configuration, the lane use request message 1106 may be retransmitted by the vehicle 1102 to the network entity 1104 if the lane use grant message 1112 is not received by the vehicle 1102 from the network entity 1104 before a timer set at a previous transmission of the lane use request message 1106 expires.

In one configuration, the lane use request message may be based on at least one of a planned route, a traffic condition, or a road condition.

At 1114*a*, the vehicle 1102 may indicate, to a user of the vehicle 1102 or a driver of the vehicle 1102, the permission for the vehicle 1102 to use the lane.

At 1114*b*, the vehicle 1102 may autonomously drive the vehicle 1102 based on the permission for the vehicle to use the lane.

At 1116, the network entity 1104 may transmit, to the vehicle 1102, a lane use revocation message. The lane use revocation message may indicate that the permission for the vehicle 1102 to use the lane is revoked.

Figure 12:
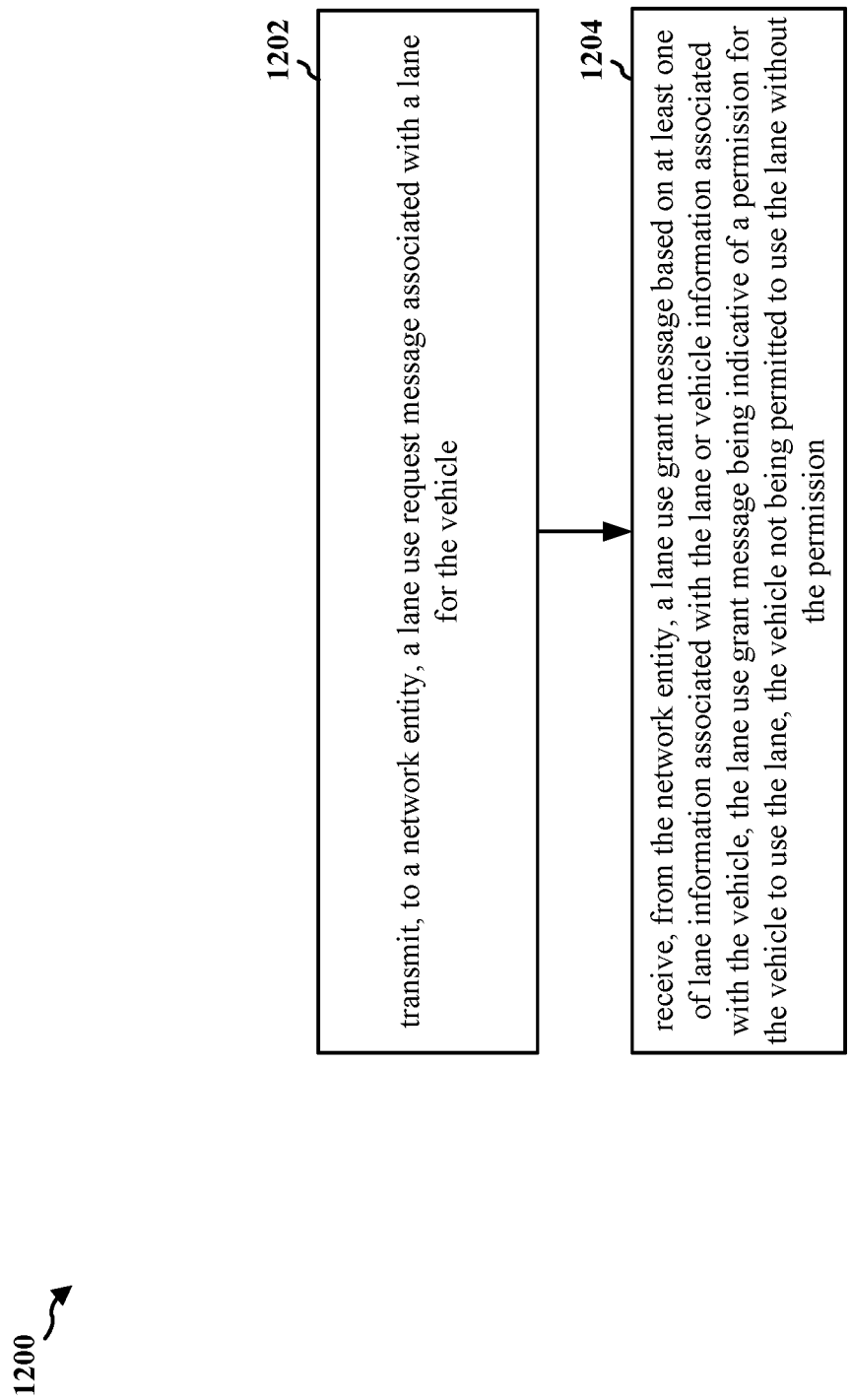
FIG. 12 is a flowchart of a method of wireless communication.

FIG. 12 is a flowchart 1200 of a method of wireless communication. The method may be performed by a vehicle (e.g., the UE/vehicle 104/350; the vehicle 400/540/542/544/ 670/672/770/772/874/1102; the apparatus 1602). At 1202, the vehicle may transmit, to a network entity, a lane use request message associated with a lane for the vehicle. For example, 1202 may be performed by the lane use component 1640 in FIG. 16. Referring to FIG. 11, at 1106, the vehicle 1102 may transmit, to a network entity 1104, a lane use request message associated with a lane for the vehicle 1102.

At 1204, the vehicle may receive, from the network entity, a lane use grant message based on at least one of lane information associated with the lane or vehicle information associated with the vehicle. The lane use grant message may be indicative of a permission for the vehicle to use the lane. The vehicle may not be permitted to use the lane without the permission. For example, 1204 may be performed by the lane use component 1640 in FIG. 16. Referring to FIG. 11, at 1112, the vehicle 1102 may receive, from the network entity 1104, a lane use grant message based on at least one of lane information associated with the lane or vehicle information associated with the vehicle 1102.

Figure 13:
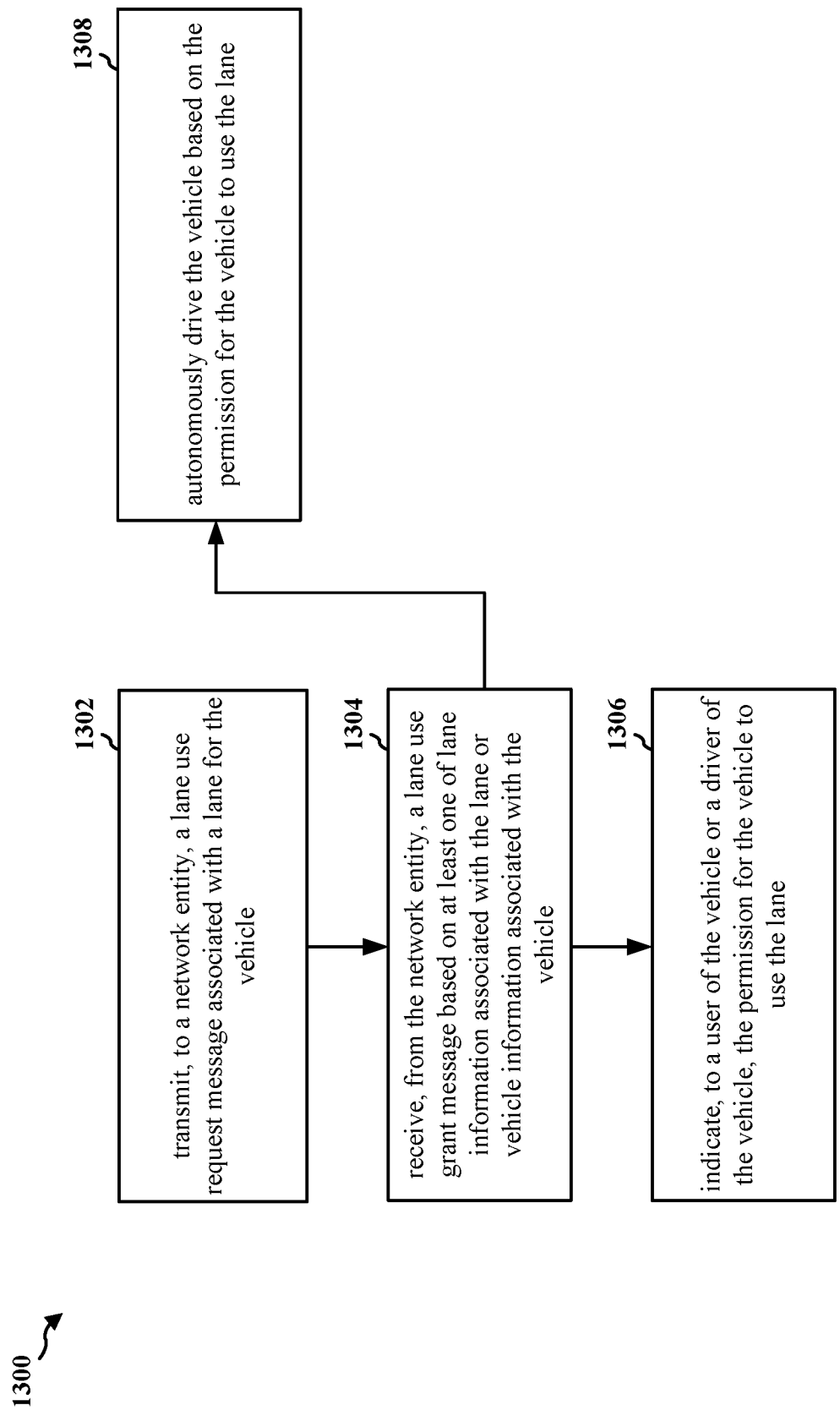
FIG. 13 is a flowchart of a method of wireless communication.

FIG. 13 is a flowchart 1300 of a method of wireless communication. The method may be performed by a vehicle (e.g., the UE/vehicle 104/350; the vehicle 400/540/542/544/ 670/672/770/772/874/1102; the apparatus 1602). At 1302, the vehicle may transmit, to a network entity, a lane use request message associated with a lane for the vehicle. For example, 1302 may be performed by the lane use component 1640 in FIG. 16. Referring to FIG. 11, at 1106, the vehicle 1102 may transmit, to a network entity 1104, a lane use request message associated with a lane for the vehicle 1102.

At 1304, the vehicle may receive, from the network entity, a lane use grant message based on at least one of lane information associated with the lane or vehicle information associated with the vehicle. The lane use grant message may be indicative of a permission for the vehicle to use the lane. The vehicle may not be permitted to use the lane without the permission. For example, 1304 may be performed by the lane use component 1640 in FIG. 16. Referring to FIG. 11, at 1112, the vehicle 1102 may receive, from the network entity 1104, a lane use grant message based on at least one of lane information associated with the lane or vehicle information associated with the vehicle 1102.

In one configuration, the lane may correspond to a flexible direction lane, an emergency lane, a road shoulder, an HOV lane, or a passing lane.

In one configuration, the lane may be associated with configurable lane directions.

The lane information may include a present lane direction associated with the lane. The vehicle information may include a present vehicle direction associated with the vehicle. The lane use grant message may be based on the present vehicle direction being consistent with the present lane direction.

In one configuration, the present lane direction may be based on at least one of a traffic condition or a time of day.

In one configuration, the lane information may include a present use or nonuse of the lane or a predicted use or nonuse of the lane by at least one emergency vehicle. The lane use grant message may be based on the lane not being used and not being expected to be used by the at least one emergency vehicle.

In one configuration, the lane may correspond to the road shoulder. The vehicle information may include an indication of an upcoming exit by the vehicle from a road associated with the road shoulder. The lane use grant message may be based on the vehicle being expected to exit the road within a predefined first distance.

In one configuration, the lane use grant message may be further indicative of a predefined second distance associated with the permission for the vehicle to use the lane. The predefined second distance may be less than the predefined first distance.

In one configuration, the indication of the upcoming exit may be associated with the lane use request message.

In one configuration, the lane information may include a traffic condition associated with the lane. The lane use grant message may be based on the lane being used by fewer vehicles than a second lane that is used by the vehicle prior to the reception of the lane use grant message.

In one configuration, the vehicle information may include a payment status associated with the vehicle. The lane use grant message may be based on the vehicle being associated with a payment for use of the lane.

In one configuration, referring to FIG. 11, the lane use request message 1106 may be retransmitted to the network entity 1104 if the lane use grant message 1112 is not received from the network entity 1104 before a timer set at a previous transmission of the lane use request message 1106 expires.

In one configuration, the lane use request message may be based on at least one of a planned route, a traffic condition, or a road condition.

In one configuration, referring to FIG. 11, the lane use request message may be transmitted to the network entity 1104 via a first WSM. The lane use grant message may be received from the network entity 1104 via an RSM or a second WSM.

In one configuration, at 1306, the vehicle may indicate, to a user of the vehicle or a driver of the vehicle, the permission for the vehicle to use the lane. For example, 1306 may be performed by the lane use component 1640 in FIG. 16. Referring to FIG. 11, at 1114*a*, the vehicle 1102 may indicate, to a user of the vehicle 1102 or a driver of the vehicle 1102, the permission for the vehicle 1102 to use the lane.

In one configuration, at 1308, the vehicle may autonomously drive the vehicle based on the permission for the vehicle to use the lane. For example, 1306 may be performed by the lane use component 1640 in FIG. 16. Referring to FIG. 11, at 1114*b*, the vehicle 1102 may autonomously drive the vehicle 1102 based on the permission for the vehicle to use the lane.

In one configuration, referring to FIG. 11, the network entity 1104 may correspond to at least one of an RSU, a TMC, or a server.

Figure 14:
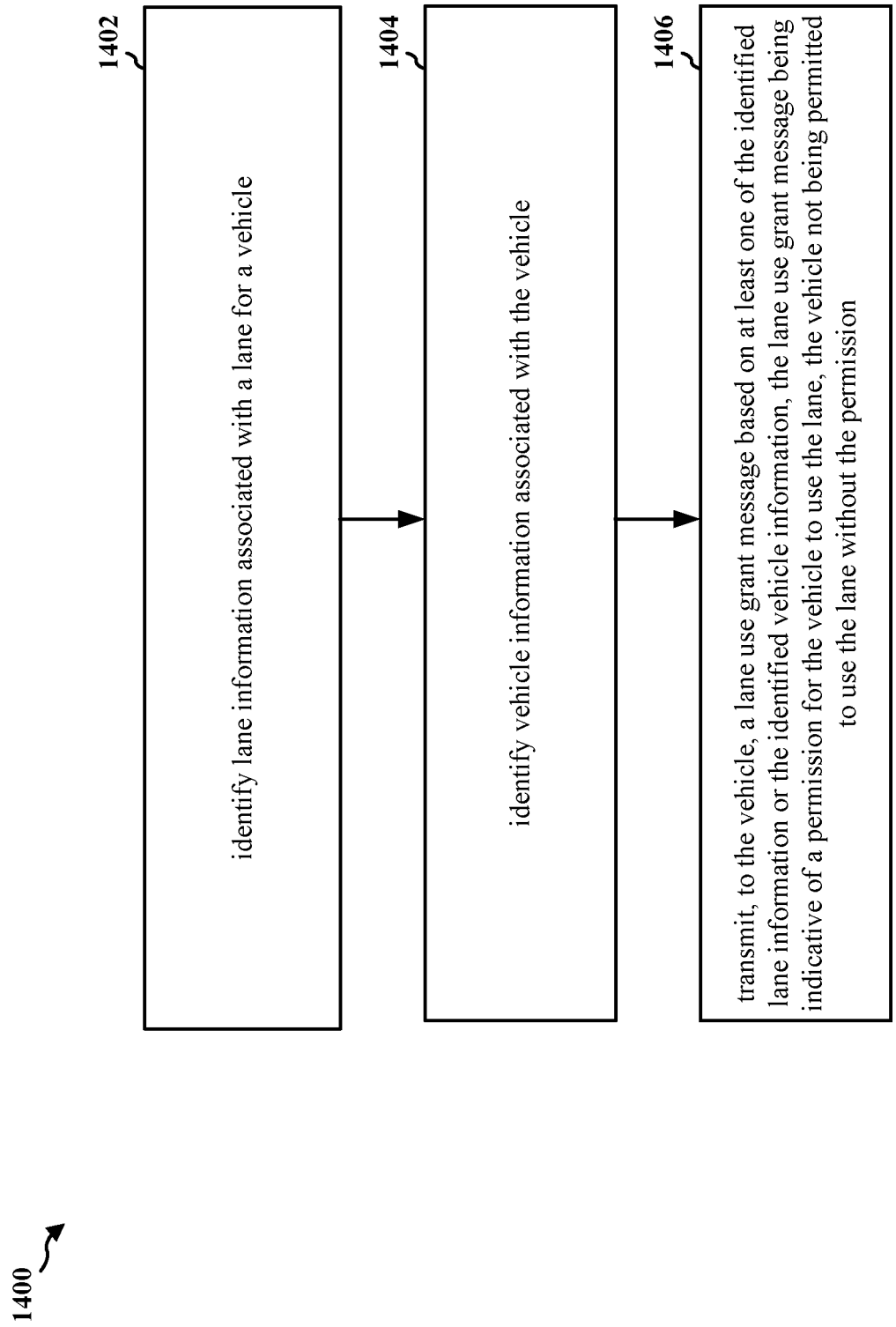
FIG. 14 is a flowchart of a method of wireless communication.

FIG. 14 is a flowchart 1400 of a method of wireless communication. The method may be performed by a network entity (e.g., the base station/network entity 102/180/310; the lane management system 580; the lane management server 582, the wireless communication node 550; the network entity 604/804/1104; the apparatus 1702). At 1402, the network entity may identify lane information associated with a lane for a vehicle. For example, 1402 may be performed by the lane management component 1740 in FIG. 17. Referring to FIG. 11, at 1108, the network entity 1104 may identify lane information associated with a lane for a vehicle 1102.

At 1404, the network entity may identify vehicle information associated with the vehicle. For example, 1404 may be performed by the lane management component 1740 in FIG. 17. Referring to FIG. 11, at 1110, the network entity 1104 may identify vehicle information associated with the vehicle 1102.

At 1406, the network entity may transmit, to the vehicle, a lane use grant message based on at least one of the identified lane information or the identified vehicle information. The lane use grant message may be indicative of a permission for the vehicle to use the lane. The vehicle may not be permitted to use the lane without the permission. For example, 1406 may be performed by the lane management component 1740 in FIG. 17. Referring to FIG. 11, at 1112, the network entity 1104 may transmit, to the vehicle 1102, a lane use grant message based on at least one of the identified lane information or the identified vehicle information.

Figure 15:
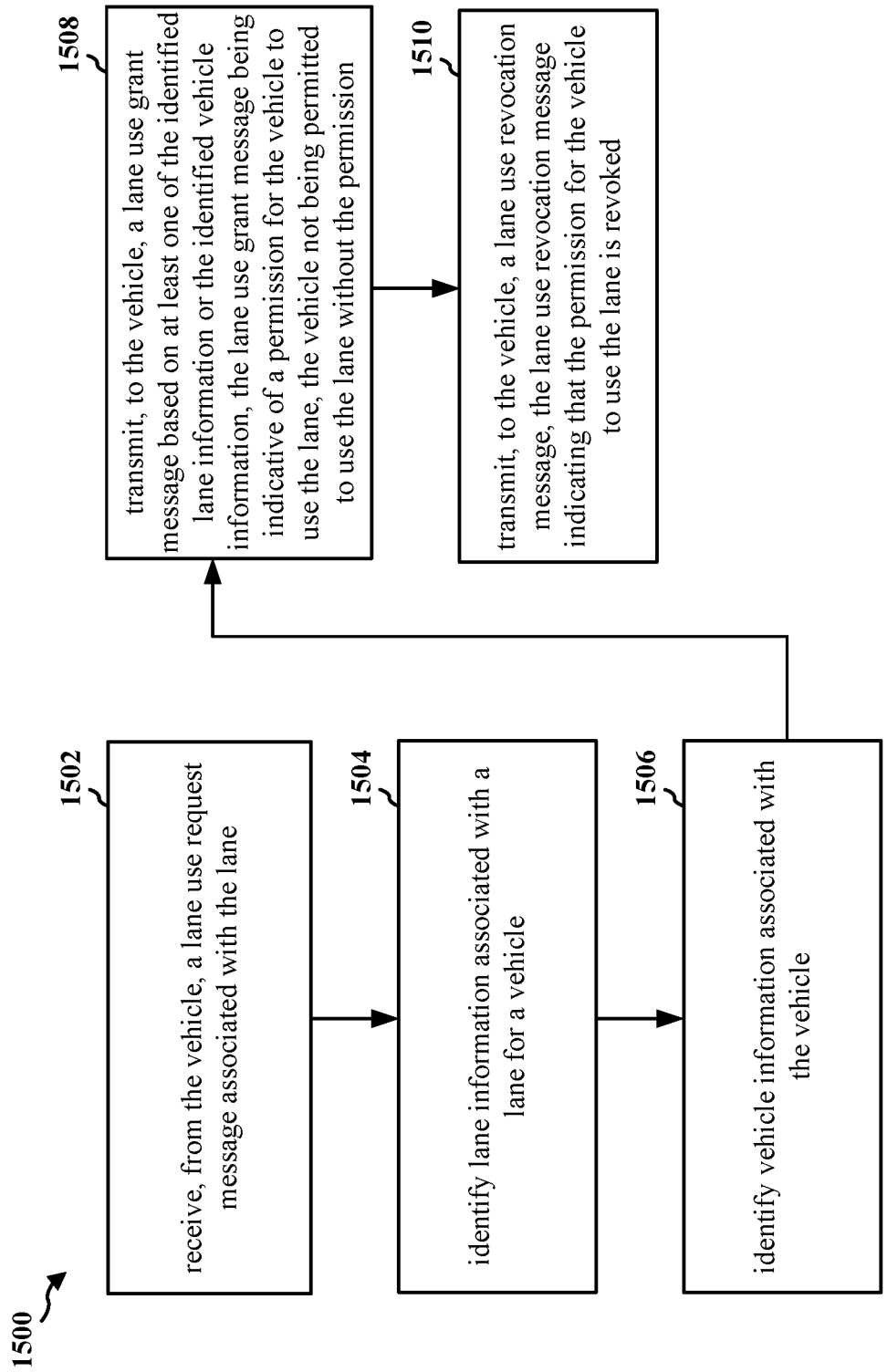
FIG. 15 is a flowchart of a method of wireless communication.

FIG. 15 is a flowchart 1500 of a method of wireless communication. The method may be performed by a network entity (e.g., the base station/network entity 102/180/310; the lane management system 580; the lane management server 582, the network entity 550/604/804/1104; the apparatus 1702). At 1504, the network entity may identify lane information associated with a lane for a vehicle. For example, 1504 may be performed by the lane management component 1740 in FIG. 17. Referring to FIG. 11, at 1108, the network entity 1104 may identify lane information associated with a lane for a vehicle 1102.

At 1506, the network entity may identify vehicle information associated with the vehicle. For example, 1506 may be performed by the lane management component 1740 in FIG. 17. Referring to FIG. 11, at 1110, the network entity 1104 may identify vehicle information associated with the vehicle 1102.

At 1508, the network entity may transmit, to the vehicle, a lane use grant message based on at least one of the identified lane information or the identified vehicle information. The lane use grant message may be indicative of a permission for the vehicle to use the lane. The vehicle may not be permitted to use the lane without the permission. For example, 1508 may be performed by the lane management component 1740 in FIG. 17. Referring to FIG. 11, at 1112, the network entity 1104 may transmit, to the vehicle 1102, a lane use grant message based on at least one of the identified lane information or the identified vehicle information.

In one configuration, the lane may correspond to a flexible direction lane, an emergency lane, a road shoulder, an HOV lane, or a passing lane.

In one configuration, the lane may be associated with configurable lane directions. The lane information may include a present lane direction associated with the lane. The vehicle information may include a present vehicle direction associated with the vehicle. The lane use grant message may be based on the present vehicle direction being consistent with the present lane direction.

In one configuration, the present lane direction may be based on at least one of a traffic condition or a time of day.

In one configuration, the lane information may include a present use or nonuse of the lane or a predicted use or nonuse of the lane by at least one emergency vehicle. The lane use grant message may be based on the lane not being used and not being expected to be used by the at least one emergency vehicle.

In one configuration, the lane may correspond to the road shoulder. The vehicle information may include an indication of an upcoming exit by the vehicle from a road associated with the road shoulder. The lane use grant message may be based on the vehicle being expected to exit the road within a predefined first distance.

In one configuration, the lane use grant message may be further indicative of a predefined second distance associated with the permission for the vehicle to use the lane. The predefined second distance may be less than the predefined first distance.

In one configuration, referring to FIG. 11, the indication of the upcoming exit may be received from the vehicle 1102.

In one configuration, the lane information may include a traffic condition associated with the lane. The lane use grant message may be based on the lane being used by fewer vehicles than a second lane that is used by the vehicle prior to the transmission of the lane use grant message.

In one configuration, referring to FIG. 11, the vehicle information may include a payment status associated with the vehicle 1102. The lane use grant message may be based on the vehicle 1102 being associated with a payment for use of the lane.

In one configuration, at 1510, the network entity may transmit, to the vehicle, a lane use revocation message. The lane use revocation message may indicate that the permission for the vehicle to use the lane is revoked. For example, 1510 may be performed by the lane management component 1740 in FIG. 17. Referring to FIG. 11, at 1116, the network entity 1104 may transmit, to the vehicle 1102, a lane use revocation message.

In one configuration, at 1502, the network entity may receive, from the vehicle, a lane use request message associated with the lane. For example, 1502 may be performed by the lane management component 1740 in FIG. 17. Referring to FIG. 11, at 1106, the network entity 1104 may receive, from the vehicle 1102, a lane use request message associated with the lane.

In one configuration, the lane use request message may be based on at least one of a planned route, a traffic condition, or a road condition.

In one configuration, referring to FIG. 11, the lane use request message may be received from the vehicle 1102 via an WSM.

In one configuration, referring to FIG. 11, the lane use grant message may be transmitted to the vehicle 1102 via an RSM or an WSM.

In one configuration, referring to FIG. 11, the network entity 1104 may correspond to at least one of an RSU, a TMC, or a server.

FIG. 16 is a diagram 1600 illustrating an example of a hardware implementation for an apparatus 1602. The apparatus 1602 may be a vehicle/UE, a component of a vehicle/UE, or may implement vehicle/UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes a lane use component 1640 that may be configured to transmit, to a network entity, a lane use request message associated with a lane for the vehicle, e.g., as described in connection with 1202 in FIGS. 12 and 1302 in FIG. 13. The lane use component 1640 may be configured to receive, from the network entity, a lane use grant message based on at least one of lane information associated with the lane or vehicle information associated with the vehicle, e.g., as described in connection with 1204 in FIGS. 12 and 1304 in FIG. 13. The lane use component 1640 may be configured to indicate, to a user of the vehicle or a driver of the vehicle, the permission for the vehicle to use the lane, e.g., as described in connection with 1306 in FIG. 13. The lane use component 1640 may be configured to autonomously drive the vehicle based on the permission for the vehicle to use the lane, e.g., as described in connection with 1308 in FIG. 13.

The apparatus may include additional components that perform each of the blocks of the algorithm in the flowcharts of FIGS. 11-13. As such, each block in the flowcharts of FIGS. 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for transmitting, to a network entity, a lane use request message associated with a lane for the vehicle. The apparatus 1602, and in particular the cellular baseband processor 1604, includes means for receiving, from the network entity, a lane use grant message based on at least one of lane information associated with the lane or vehicle information associated with the vehicle. The lane use grant message may be indicative of a permission for the vehicle to use the lane. The vehicle may not be permitted to use the lane without the permission.

In one configuration, the lane may correspond to a flexible direction lane, an emergency lane, a road shoulder, an HOV lane, or a passing lane. In one configuration, the lane may be associated with configurable lane directions. The lane information may include a present lane direction associated with the lane. The vehicle information may include a present vehicle direction associated with the vehicle. The lane use grant message may be based on the present vehicle direction being consistent with the present lane direction. In one configuration, the present lane direction may be based on at least one of a traffic condition or a time of day. In one configuration, the lane information may include a present use or nonuse of the lane or a predicted use or nonuse of the lane by at least one emergency vehicle. The lane use grant message may be based on the lane not being used and not being expected to be used by the at least one emergency vehicle. In one configuration, the lane may correspond to the road shoulder. The vehicle information may include an indication of an upcoming exit by the vehicle from a road associated with the road shoulder. The lane use grant message may be based on the vehicle being expected to exit the road within a predefined first distance. In one configuration, the lane use grant message may be further indicative of a predefined second distance associated with the permission for the vehicle to use the lane. The predefined second distance may be less than the predefined first distance. In one configuration, the indication of the upcoming exit may be associated with the lane use request message. In one configuration, the lane information may include a traffic condition associated with the lane. The lane use grant message may be based on the lane being used by fewer vehicles than a second lane that is used by the vehicle prior to the reception of the lane use grant message. In one configuration, the vehicle information may include a payment status associated with the vehicle. The lane use grant message may be based on the vehicle being associated with a payment for use of the lane. In one configuration, the lane use request message may be retransmitted to the network entity if the lane use grant message is not received from the network entity before a timer set at a previous transmission of the lane use request message expires. In one configuration, the lane use request message may be based on at least one of a planned route, a traffic condition, or a road condition. In one configuration, the lane use request message may be transmitted to the network entity via a first WSM. The lane use grant message may be received from the network entity via an RSM or a second WSM. In one configuration, the apparatus 1602, and in particular the cellular baseband processor 1604, includes means for indicating, to a user of the vehicle or a driver of the vehicle, the permission for the vehicle to use the lane. In one configuration, the apparatus 1602, and in particular the cellular baseband processor 1604, includes means for autonomously driving the vehicle based on the permission for the vehicle to use the lane. In one configuration, the network entity may correspond to at least one of an RSU, a TMC, or a server.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
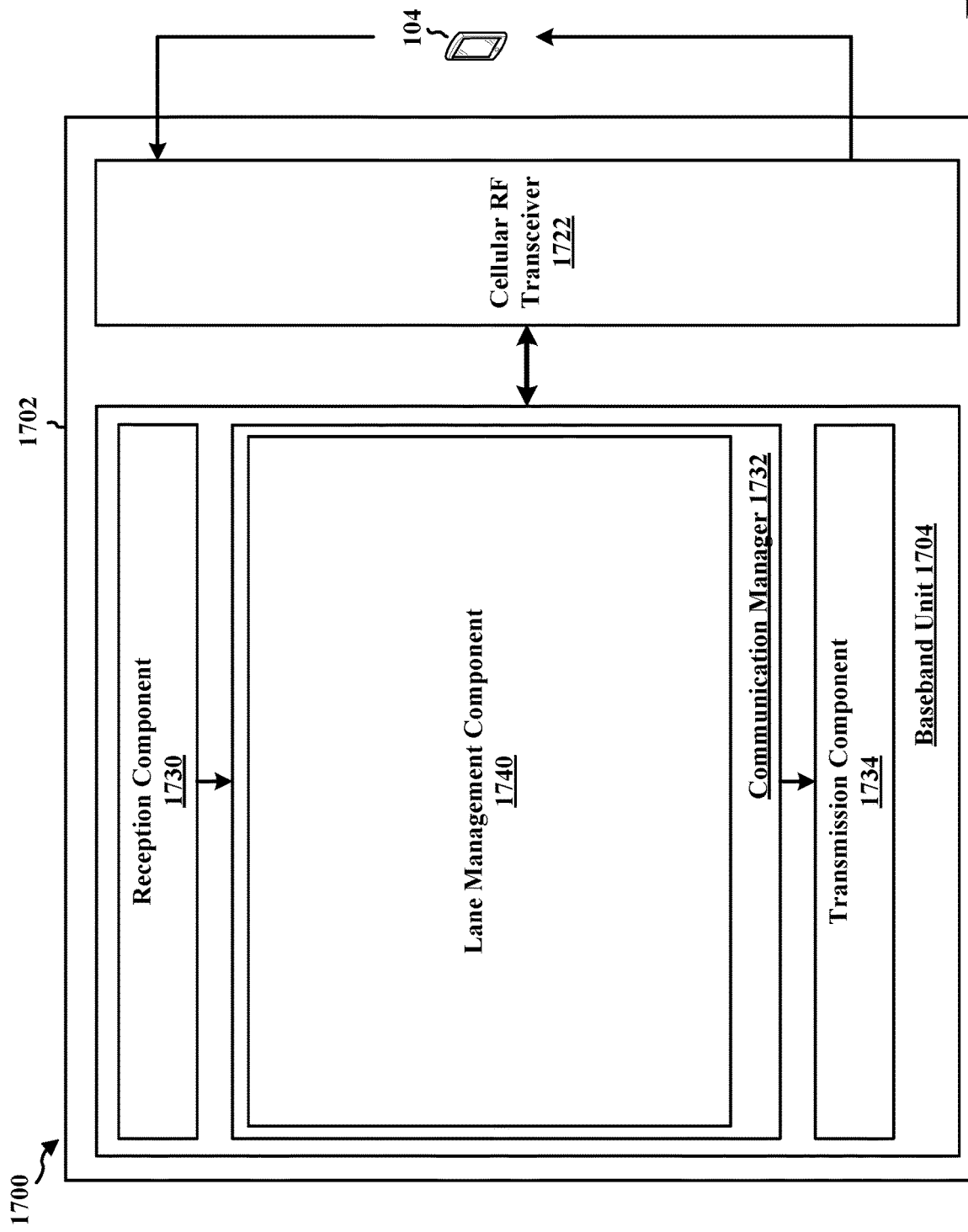
FIG. 17 is a diagram illustrating an example of a hardware implementation for an example apparatus.

FIG. 17 is a diagram 1700 illustrating an example of a hardware implementation for an apparatus 1702. The apparatus 1702 may be a network entity (e.g., an RSU, a TMC, a server, etc.), a component of a network entity, or may implement network entity functionality. In some aspects, the apparatus 1702 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a lane management component 1740 that may be configured to receive, from the vehicle, a lane use request message associated with the lane, e.g., as described in connection with 1502 in FIG. 15. The lane management component 1740 may be configured to identify lane information associated with a lane for a vehicle, e.g., as described in connection with 1402 in FIGS. 14 and 1504 in FIG. 15. The lane management component 1740 may be configured to identify vehicle information associated with the vehicle, e.g., as described in connection with 1404 in FIGS. 14 and 1506 in FIG. 15. The lane management component 1740 may be configured to transmit, to the vehicle, a lane use grant message based on at least one of the identified lane information or the identified vehicle information, e.g., as described in connection with 1406 in FIGS. 14 and 1508 in FIG. 15. The lane management component 1740 may be configured to transmit, to the vehicle, a lane use revocation message, e.g., as described in connection with 1510 in FIG. 15.

The apparatus may include additional components that perform each of the blocks of the algorithm in the flowcharts of FIGS. 11, 14, and 15. As such, each block in the flowcharts of FIGS. 11, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for identifying lane information associated with a lane for a vehicle. The apparatus 1702, and in particular the baseband unit 1704, includes means for identifying vehicle information associated with the vehicle. The apparatus 1702, and in particular the baseband unit 1704, includes means for transmitting, to the vehicle, a lane use grant message based on at least one of the identified lane information or the identified vehicle information. The lane use grant message may be indicative of a permission for the vehicle to use the lane. The vehicle may not be permitted to use the lane without the permission.

In one configuration, the lane may correspond to a flexible direction lane, an emergency lane, a road shoulder, an HOV lane, or a passing lane. In one configuration, the lane may be associated with configurable lane directions. The lane information may include a present lane direction associated with the lane. The vehicle information may include a present vehicle direction associated with the vehicle. The lane use grant message may be based on the present vehicle direction being consistent with the present lane direction. In one configuration, the present lane direction may be based on at least one of a traffic condition or a time of day. In one configuration, the lane information may include a present use or nonuse of the lane or a predicted use or nonuse of the lane by at least one emergency vehicle. The lane use grant message may be based on the lane not being used and not being expected to be used by the at least one emergency vehicle. In one configuration, the lane may correspond to the road shoulder. The vehicle information may include an indication of an upcoming exit by the vehicle from a road associated with the road shoulder. The lane use grant message may be based on the vehicle being expected to exit the road within a predefined first distance. In one configuration, the lane use grant message may be further indicative of a predefined second distance associated with the permission for the vehicle to use the lane. The predefined second distance may be less than the predefined first distance. In one configuration, the indication of the upcoming exit may be received from the vehicle. In one configuration, the lane information may include a traffic condition associated with the lane. The lane use grant message may be based on the lane being used by fewer vehicles than a second lane that is used by the vehicle prior to the transmission of the lane use grant message. In one configuration, the vehicle information may include a payment status associated with the vehicle. The lane use grant message may be based on the vehicle being associated with a payment for use of the lane. In one configuration, the apparatus 1702, and in particular the baseband unit 1704, includes means for transmitting, to the vehicle, a lane use revocation message. The lane use revocation message may indicate that the permission for the vehicle to use the lane is revoked. In one configuration, the apparatus 1702, and in particular the baseband unit 1704, includes means for receiving, from the vehicle, a lane use request message associated with the lane. In one configuration, the lane use request message may be based on at least one of a planned route, a traffic condition, or a road condition. In one configuration, the lane use request message may be received from the vehicle via an WSM. In one configuration, the lane use grant message may be transmitted to the vehicle via an RSM or an WSM. In one configuration, the network entity may correspond to at least one of an RSU, a TMC, or a server.

The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-17, a vehicle may transmit, to a network entity, a lane use request message associated with a lane for the vehicle. The network entity may identify lane information associated with a lane for a vehicle. The network entity may identify vehicle information associated with the vehicle. The network entity may transmit, to the vehicle, and the vehicle may receive, from the network entity, a lane use grant message based on at least one of the identified lane information or the identified vehicle information. The lane use grant message may be indicative of a permission for the vehicle to use the lane. The vehicle may not be permitted to use the lane without the permission. Accordingly, the C-V2X capability of a vehicle may be used to reduce traffic congestion without the cost of expanding highways or building more tunnels. Less traffic congestion may ultimately help the environment as well by reducing the overall emissions on the road. Further, the user paid fee based permission to use special lanes or roads may provide an additional source of revenue.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a vehicle including at least one processor communicatively coupled to a memory and at least one transceiver, the at least one processor configured to transmit, to a network entity, a lane use request message associated with a lane for the vehicle; and receive, from the network entity, a lane use grant message based on at least one of lane information associated with the lane or vehicle information associated with the vehicle, the lane use grant message being indicative of a permission for the vehicle to use the lane, the vehicle not being permitted to use the lane without the permission.

Aspect 2 is the apparatus of aspect 1, where the lane corresponds to a flexible direction lane, an emergency lane, a road shoulder, an HOV lane, or a passing lane.

Aspect 3 is the apparatus of aspect 2, where the lane is associated with configurable lane directions, the lane information includes a present lane direction associated with the lane, the vehicle information includes a present vehicle direction associated with the vehicle, and the lane use grant message is based on the present vehicle direction being consistent with the present lane direction.

Aspect 4 is the apparatus of aspect 3, where the present lane direction is based on at least one of a traffic condition or a time of day.

Aspect 5 is the apparatus of any of aspects 2 to 4, where the lane information includes a present use or nonuse of the lane or a predicted use or nonuse of the lane by at least one emergency vehicle, and the lane use grant message is based on the lane not being used and not being expected to be used by the at least one emergency vehicle.

Aspect 6 is the apparatus of aspect 2, where the lane corresponds to the road shoulder, the vehicle information includes an indication of an upcoming exit by the vehicle from a road associated with the road shoulder, the lane use grant message is based on the vehicle being expected to exit the road within a predefined first distance, and the indication of the upcoming exit is associated with the lane use request message.

Aspect 7 is the apparatus of aspect 6, where the lane use grant message is further indicative of a predefined second distance associated with the permission for the vehicle to use the lane, and the predefined second distance is less than the predefined first distance.

Aspect 8 is the apparatus of any of aspects 2 to 5, where the lane information includes a traffic condition associated with the lane, and the lane use grant message is based on the lane being used by fewer vehicles than a second lane that is used by the vehicle prior to the reception of the lane use grant message.

Aspect 9 is the apparatus of any of aspects 2 to 8, where the vehicle information includes a payment status associated with the vehicle, and the lane use grant message is based on the vehicle being associated with a payment for use of the lane.

Aspect 10 is the apparatus of any of aspects 1 to 9, where the lane use request message is retransmitted to the network entity if the lane use grant message is not received from the network entity before a timer set at a previous transmission of the lane use request message expires.

Aspect 11 is the apparatus of any of aspects 1 to 10, where the lane use request message is based on at least one of a planned route, a traffic condition, or a road condition.

Aspect 12 is the apparatus of any of aspects 1 to 11, where the lane use request message is transmitted to the network entity via a first WSM, and the lane use grant message is received from the network entity via an RSM or a second WSM.

Aspect 13 is the apparatus of any of aspects 1 to 12, the at least one processor being further configured to: indicate, to a user of the vehicle or a driver of the vehicle, the permission for the vehicle to use the lane.

Aspect 14 is the apparatus of any of aspects 1 to 13, the at least one processor being further configured to: autonomously drive the vehicle based on the permission for the vehicle to use the lane.

Aspect 15 is an apparatus for wireless communication at a network entity including at least one processor communicatively coupled to a memory and at least one transceiver, the at least one processor configured to identify lane information associated with a lane for a vehicle; identify vehicle information associated with the vehicle; and transmit, to the vehicle, a lane use grant message based on at least one of the identified lane information or the identified vehicle information, the lane use grant message being indicative of a permission for the vehicle to use the lane, the vehicle not being permitted to use the lane without the permission.

Aspect 16 is the apparatus of aspect 15, where the lane corresponds to a flexible direction lane, an emergency lane, a road shoulder, an HOV lane, or a passing lane.

Aspect 17 is the apparatus of aspect 16, where the lane is associated with configurable lane directions, the lane information includes a present lane direction associated with the lane, the vehicle information includes a present vehicle direction associated with the vehicle, the lane use grant message is based on the present vehicle direction being consistent with the present lane direction, and the present lane direction is based on at least one of a traffic condition or a time of day.

Aspect 18 is the apparatus of any of aspects 16 and 17, where the lane information includes a present use or nonuse of the lane or a predicted use or nonuse of the lane by at least one emergency vehicle, and the lane use grant message is based on the lane not being used and not being expected to be used by the at least one emergency vehicle.

Aspect 19 is the apparatus of aspect 16, where the lane corresponds to the road shoulder, the vehicle information includes an indication of an upcoming exit by the vehicle from a road associated with the road shoulder, and the lane use grant message is based on the vehicle being expected to exit the road within a predefined first distance.

Aspect 20 is the apparatus of aspect 19, where the lane use grant message is further indicative of a predefined second distance associated with the permission for the vehicle to use the lane, and the predefined second distance is less than the predefined first distance.

Aspect 21 is the apparatus of any of aspects 19 and 20, where the indication of the upcoming exit is received from the vehicle.

Aspect 22 is the apparatus of any of aspects 16 to 21, where the lane information includes a traffic condition associated with the lane, and the lane use grant message is based on the lane being used by fewer vehicles than a second lane that is used by the vehicle prior to the transmission of the lane use grant message.

Aspect 23 is the apparatus of any of aspects 16 to 22, where the vehicle information includes a payment status associated with the vehicle, and the lane use grant message is based on the vehicle being associated with a payment for use of the lane.

Aspect 24 is the apparatus of any of aspects 15 to 23, the at least one processor being further configured to: transmit, to the vehicle, a lane use revocation message, the lane use revocation message indicating that the permission for the vehicle to use the lane is revoked.

Aspect 25 is the apparatus of any of aspects 15 to 24, the at least one processor being further configured to: receive, from the vehicle, a lane use request message associated with the lane.

Aspect 26 is the apparatus of aspect 25, where the lane use request message is based on at least one of a planned route, a traffic condition, or a road condition.

Aspect 27 is the apparatus of any of aspects 25 and 26, where the lane use request message is received from the vehicle via an WSM.

Aspect 28 is the apparatus of any of aspects 15 to 27, where the lane use grant message is transmitted to the vehicle via an RSM or an WSM.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication at a vehicle, comprising:
   memory;
   at least one transceiver; and
   at least one processor communicatively coupled to the memory and the at least one transceiver, the at least one processor configured to:
   transmit, to a network entity, a lane use request message associated with a second lane in a set of lanes based on a planned route, a current traffic condition, and a road condition;
   receive, from the network entity in association with traffic balancing and based on the lane use request message, a lane use grant message if a first lane in the set of lanes travelled by the vehicle is more heavily occupied than the second lane in the set of lanes; and
   indicate, based on the lane use grant message, a direction for the vehicle to use the second lane or autonomously drive the vehicle to the second lane.

2. The apparatus of claim 1, wherein the second lane corresponds to a high occupancy vehicle (HOV) lane or a truck lane.

3. The apparatus of claim 1, wherein to indicate, based on the lane use grant message, the direction for the vehicle to use the second lane or autonomously drive the vehicle to the second lane, the at least one processor is configured to:
   autonomously drive the vehicle to the second lane based on the lane use grant message.

4. The apparatus of claim 1, wherein the lane use request message is configured to be retransmitted to the network entity if the lane use grant message is not received from the network entity before a timer set at a previous transmission of the lane use request message expires.

5. The apparatus of claim 1, wherein to receive the lane use grant message, the at least one processor is configured to receive the lane use grant message from the network entity via a roadside safety message (RSM) or a wireless access in vehicular environments (WAVE) short message (WSM).

6. The apparatus of claim 1, wherein to indicate the direction for the vehicle to use the second lane, the at least one processor is configured to:
   indicate, to a user of the vehicle or a driver of the vehicle, the direction for the vehicle to use the second lane.

7. A method of wireless communication at a vehicle, comprising:
   transmitting, to a network entity, a lane use request message associated with a second lane in a set of lanes based on a planned route, a current traffic condition, and a road condition;
   receiving, from the network entity in association with traffic and based on the lane use request message, a lane use grant message if a first lane in the set of lanes travelled by the vehicle is more heavily occupied than the second lane in the set of lanes; and
   indicating, based on the lane use grant message, a direction for the vehicle to use the second lane or autonomously drive the vehicle to the second lane.

8. An apparatus for wireless communication at a network entity, comprising:
   memory;
   at least one transceiver; and
   at least one processor communicatively coupled to the memory and the at least one transceiver, the at least one processor configured to:
   receive, from a vehicle, a lane use request message associated with a second lane in a set of lanes based on a planned route, a current traffic condition, and a road condition associated with the vehicle;
   identify, in association with traffic balancing and based on the lane use request message, a first lane in the set of lanes travelled by the vehicle is more heavily occupied than the second lane in the set of lanes; and
   transmit, to the vehicle, a lane use grant message based on an identification that the first lane is more heavily occupied than the second lane, the lane use grant message being indicative of a direction for the vehicle to use the second lane or indicates the vehicle to autonomously drive the vehicle to the second lane.

9. The apparatus of claim 8, wherein the second lane corresponds to a high occupancy vehicle (HOV) lane or a truck lane.

10. The apparatus of claim 8, wherein the lane use grant message indicates the vehicle to autonomously drive the vehicle to the second lane.

11. The apparatus of claim 8, wherein to transmit the lane use grant message, the at least one processor is configured to transmit the lane use grant message to the vehicle via a roadside safety message (RSM) or a wireless access in vehicular environments (WAVE) short message (WSM).

12. A method of wireless communication at a network entity, comprising:
   receiving, from a vehicle, a lane use request message associated with a second lane in a set of lanes based on a planned route, a current traffic condition, and a road condition associated with the vehicle;
   identifying, in association with traffic balancing and based on the lane use request message, a first lane in the set of lanes travelled by the vehicle is more heavily occupied than the second lane in the set of lanes; and
   transmitting, to the vehicle, a lane use grant message based on an identification that the first lane is more heavily occupied than the second lane, the lane use grant message being indicative of a direction for the vehicle to use the second lane or indicates the vehicle to autonomously drive the vehicle to the second lane.

* * * * *